US010600103B2

(12) United States Patent
McCluskey

(10) Patent No.: US 10,600,103 B2
(45) Date of Patent: *Mar. 24, 2020

(54) SYSTEM AND METHOD FOR AGGREGATING USED VEHICLE DATA AND PRESENTING USED VEHICLES FOR SALE

(71) Applicant: McCluskey Chevrolet, Inc., Cincinnati, OH (US)

(72) Inventor: Keith P. McCluskey, Cincinnati, OH (US)

(73) Assignee: MCCLUSKEY CHEVROLET, INC., Cincinnati, OH (US)

( * ) Notice: Subject to any disclaimer, the term of this patent is extended or adjusted under 35 U.S.C. 154(b) by 340 days.

This patent is subject to a terminal disclaimer.

(21) Appl. No.: 15/602,577

(22) Filed: May 23, 2017

(65) Prior Publication Data
US 2017/0255983 A1 Sep. 7, 2017

Related U.S. Application Data

(63) Continuation-in-part of application No. 13/838,439, filed on Mar. 15, 2013, now Pat. No. 9,691,095.

(60) Provisional application No. 61/728,042, filed on Nov. 19, 2012.

(51) Int. Cl.
*G06Q 30/06* (2012.01)
*G06Q 30/08* (2012.01)
*G06Q 10/08* (2012.01)

(52) U.S. Cl.
CPC ....... *G06Q 30/0627* (2013.01); *G06Q 10/087* (2013.01); *G06Q 30/06* (2013.01); *G06Q 30/0603* (2013.01); *G06Q 30/0605* (2013.01); *G06Q 30/0619* (2013.01); *G06Q 30/08* (2013.01)

(58) Field of Classification Search
CPC ...... G06Q 10/08; G06Q 10/087; G06Q 30/06; G06Q 30/0601–0643; G06Q 30/08
See application file for complete search history.

(56) References Cited

U.S. PATENT DOCUMENTS

| | | | |
|---|---|---|---|
| 9,691,095 B2 * | 6/2017 | McCluskey | ........ G06Q 30/0627 |
| 2003/0130966 A1 | 7/2003 | Thompson | |
| 2005/0228736 A1 | 10/2005 | Norman et al. | |
| 2007/0016513 A1 | 1/2007 | Kelly | |
| 2007/0038522 A1 | 2/2007 | Bell | |
| 2008/0103943 A1 | 5/2008 | Williams et al. | |
| 2010/0185525 A1 * | 7/2010 | Hazen | ........... G06Q 10/087 |
| | | | 705/26.1 |

(Continued)

OTHER PUBLICATIONS

The Art of the Deal: How to Haggle for a Used Car.: Elisabeth Leamy and Vanessa Weber, Oct. 11, 2010, ABC News.

*Primary Examiner* — William J Allen
(74) *Attorney, Agent, or Firm* — Thompson Hine L.L.P.

(57) ABSTRACT

A computerized system collects used vehicle data regarding vehicles available for sale from numerous sources (e.g., as from a vehicle auction system), and modifies and supplements such vehicle data for presentation to the consuming public in a searchable manner such that a single entity (e.g., a specific dealer) can offer all of the vehicles for sale to consumers while accounting for the various costs that will be incurred by the selling entity to successfully complete the sales transaction. The system may include interactive functionality with CRM systems to facilitate customer communications.

15 Claims, 43 Drawing Sheets

(56) References Cited

U.S. PATENT DOCUMENTS

2010/0217616 A1    8/2010  Colson
2010/0274631 A1*  10/2010  McFall ............. G06Q 30/0203
                                                            705/7.32
2011/0119158 A1    5/2011  Gladstone

* cited by examiner

McCluskey Wholesale - Windows Internet Explorer http://www.mccluskeywholesale.com ☐ Convert ☐ Select

McCLUSKEY Ⓜ WHOLESALE
WHOLESALE TO THE PUBLIC

Need Help? Call: 555-555-5555
Email: savemoney@mccluskey.com

Vehicles Available: 0 0 1 9 0  — 62

Click any tab below to begin your search!

- VEHICLE TYPES
- MAKES
- MODELS — 64C
- PRICE RANGE
- MODEL YEAR RANGE
- MILEAGE RANGE
- COLORS
- OPTIONS

Click to restart your search! (Restart)

NARROW YOUR SEARCH BY MODEL

CADILLAC — 66C

| ☐ Allante | ☐ Escalade Hybrid |
| ☑ CTS | ☐ Seville |
| ☐ CTS-V | ☐ SRX |
| ☐ Deville | ☐ STS |
| ☐ DTS | ☐ STS-V |
| ☐ Escalade | ☐ XLR |
| ☐ Escalade ESV | ☐ XLR-V |
| ☐ Escalade EXT | |

190 matches out of 14,854 vehicles — 68

⬍ Narrow My List / Show My List — 70

Inventory and sales updated through September 27, 2012

| | | Year | Miles | NADA Average Sales Price | Your Savings | |
|---|---|---|---|---|---|---|
| Stock#:2142569 | 2010 Cadillac CTS<br>Exterior:Black Ice,Interior:Ebony,<br>Ebony,Transmission:Automatic,Drive:<br>All,Trim:AWDw/1SA,Engine:3.0L... | 2009 | 24,857 | $30,550 | $1,527 | GET MORE INFORMATION » |
| Stock#:4819301 | 2010 Cadillac CTS<br>Exterior:Radiant Silver,Interior:<br>Tan,Transmission:Automatic,Drive:<br>Rear,Trim:RWDw/1SA,Engine:3.0L... | 2009 | 30,443 | $29,800 | $1,490 | GET MORE INFORMATION » |
| | | 2010 | | $29,575 | $1,479 | GET MORE INFORMATION » |
| | | 2010 | | $29,125 | $1,456 | GET MORE INFORMATION » |
| | | 2010 | | $29,125 | $1,456 | GET MORE INFORMATION » |
| | | 2010 | | $28,325 | $1,416 | GET MORE INFORMATION » |

McCluskey Wholesale - Windows Internet Explorer http://www.mccluskeywholesale.com

File  Edit  View  Favorites  Tools  Help

☐ Convert  ☐ Select

Vehicles Available: 0 0 0 2 1 — 62

Click any tab below to begin your search!

| VEHICLE TYPES |
| MAKES |
| MODELS |
| PRICE RANGE |
| MODEL YEAR RANGE |
| MILEAGE RANGE |
| COLORS | — 64G
| OPTIONS |

Click to restart your search! (Restart)

McCLUSKEY Ⓜ WHOLESALE
WHOLESALE TO THE PUBLIC

Need Help?  Call: 555-555-5555  Email: savemoney@mccluskey.com

NARROW YOUR SEARCH BY COLOR — 70

☑ Black      ☐ Blue       ☐ Brown
☐ Gold       ☐ Maroon     ☐ Red
☑ Silver     ☑ White

66G

21 matches out of 14,854 vehicles — 68

◀ Narrow My List     Ⓜ    Show My List ▶

Inventory and sales updated through September 27, 2012

| | Miles | Year | NADA Average Sales Price | Your Savings | |
|---|---|---|---|---|---|
| Stock#:2142569 2010 Cadillac CTS Exterior:Black Ice,Interior:Ebony, Ebony,Transmission:Automatic,Drive: All,Trim:AWDw/1SA,Engine:3.0L... | 24,857 | 2009 | $30,550 | $1,527 | GET MORE INFORMATION ≫ |
| | | 2009 | $29,800 | $1,490 | GET MORE INFORMATION ≫ |
| Stock#:4819301 2010 Cadillac CTS Exterior:Radiant Silver,Interior: Tan,Transmission:Automatic,Drive: Rear,Trim:RWDw/1SA,Engine:3.0L... | 30,443 | 2010 | $29,575 | $1,479 | GET MORE INFORMATION ≫ |
| | | 2010 | $29,125 | $1,456 | GET MORE INFORMATION ≫ |
| | | 2010 | $29,125 | $1,456 | GET MORE INFORMATION ≫ |
| | | 2010 | $28,325 | $1,416 | GET MORE INFORMATION ≫ |

| | | Miles | Year | NADA Average Sales Price | Your Wholesale Price | Your Savings | |
|---|---|---|---|---|---|---|---|
| | 2009 Cadillac CTS<br>Exterior:Black Raven,Interior:Ebony,<br>Ebony,Transmission:Automatic,Drive:<br>Rear,Trim:Performance,Engine:3.0L...<br>Stock#:2756079 | 20,866 | 2009 | $30,550 | $29,023 | $1,527 | GET MORE INFORMATION >> |
| | 2010 Cadillac CTS<br>Exterior:Radiant Silver,Interior:<br>Ebony,Ebony,Transmission:Automatic,<br>Drive:Rear,Trim:Performance...<br>Stock#:335164 | 10,725 | 2009 | $29,800 | $28,310 | $1,490 | GET MORE INFORMATION >> |
| | 2009 Cadillac CTS<br>Exterior:Black Raven,Interior:Cash-<br>mere/Cocoa,Transmission:Automatic,<br>Drive:All,Trim:Luxury,Engine:3.0L...<br>Stock#:126927 | 31,758 | 2010 | $29,575 | $28,096 | $1,479 | GET MORE INFORMATION >> |
| | 2010 Cadillac CTS<br>Exterior:Black Raven,Interior:Ebony,<br>Ebony,Transmission:Automatic,Drive:<br>All,Trim:Luxury,Engine:3.0L...<br>Stock#:3937830 | 23,921 | 2010 | $29,125 | $27,669 | $1,456 | GET MORE INFORMATION >> |
| | 2010 Cadillac CTS<br>Exterior:Black Ice,Interior:Ebony,<br>Ebony,Transmission:Automatic,Drive:<br>All,Trim:AWD/w/1SA,Engine:3.0L...<br>Stock#:2142569 | 24,857 | 2010 | $29,125 | $27,669 | $1,456 | GET MORE INFORMATION >> |
| | 2010 Cadillac CTS<br>Exterior:Radiant Silver,Interior:<br>Tan,Transmission:Automatic,Drive:<br>Rear,Trim:RWDw/1SA,Engine:3.0L... <br>Stock#:4819301 | 30,443 | 2010 | $28,325 | $26,909 | $1,416 | GET MORE INFORMATION >> |

Vehicles Available: 00016

McCLUSKEY (M) WHOLESALE
WHOLESALE TO THE PUBLIC

Need Help? Call: 555-555-5555
Email: savemoney@mccluskey.com

Inventory and sales updated through September 27, 2012

Click any tab below to begin your search!

- VEHICLE TYPES
- MAKES
- MODELS
- PRICE RANGE
- MODEL YEAR RANGE
- MILEAGE RANGE
- COLORS
- OPTIONS

Click to restart your search! (Restart)

McCluskey Wholesale — WHOLESALE TO THE PUBLIC

Need Help? Call: 555-555-5555  Email: savemoney@mccluskey.com

Inventory and sales updated through September 27, 2012

| | | Miles | Year | NADA Average Sales Price | Your Wholesale Price | Your Savings | |
|---|---|---|---|---|---|---|---|
| Stock#:1157446 | 2010 Cadillac CTS Exterior:Black Raven,Interior:Ebony, Ebony,Transmission:Automatic,Drive: Rear,Trim:Performance,Engine:3.0L... | 30,656 | 2010 | $29,225 | $29,899 | -$674 | GET MORE INFORMATION |
| Stock#:1366196 | 2008 Cadillac CTS Exterior:Radiant Silver,Interior: Ebony,Ebony,Transmission:Automatic, Drive:Rear,Trim:Performance... | 27,402 | 2008 | $24,900 | $24,910 | -$10 | GET MORE INFORMATION |
| Stock#:1361916 | 2010 Cadillac CTS Exterior:Black Raven,Interior:Cash-mere/Cocoa,Transmission:Automatic, Drive:All,Trim:Luxury,Engine:3.0L... | 27,932 | 2010 | $28,550 | $27,980 | $570 | GET MORE INFORMATION |
| Stock#:1152346 | 2009 Cadillac CTS Exterior:Black Raven,Interior:Ebony, Ebony,Transmission:Automatic,Drive: All,Trim:AWD,Engine:3.0L... | 27,211 | 2009 | $29,375 | $28,426 | $949 | GET MORE INFORMATION |
| Stock#:1846466 | 2010 Cadillac CTS Exterior:Black Ice,Interior:Ebony, Ebony,Transmission:Automatic,Drive: All,Trim:AWD/USA,Engine:3.0L... | 29,584 | 2010 | $28,550 | $27,254 | $1,296 | GET MORE INFORMATION |
| Stock#:4510252 | 2009 Cadillac CTS Exterior:Radiant Silver,Interior: Tan,Transmission:Automatic,Drive: Rear,Trim:RWD/USA,Engine:3.0L... | 24,188 | 2009 | $26,900 | $25,555 | $1,345 | GET MORE INFORMATION |

Vehicles Available: 00016

Click any tab below to begin your search!

- VEHICLE TYPES
- MAKES
- MODELS
- PRICE RANGE
- MODEL YEAR RANGE
- MILEAGE RANGE
- COLORS
- OPTIONS

Click to restart your search! (Restart)

McCluskey Wholesale - Windows Internet Explorer http://www.mccluskeywholesale.com

File  Edit  View  Favorites  Tools  Help

☐ Convert  ☐ Select

Vehicles Available: 0 0 0 1 6

Click any tab below to begin your search!

- VEHICLE TYPES
- MAKES
- MODELS
- PRICE RANGE
- MODEL YEAR RANGE
- MILEAGE RANGE
- COLORS
- OPTIONS

Click to restart your search! (Restart)

McCLUSKEY (M) WHOLESALE
WHOLESALE TO THE PUBLIC

Need Help?  Call: 555-555-5555
Email: savemoney@mccluskey.com

Inventory and sales updated through September 27, 2012

| Submit to Purchasing Center | Present My Cars | Back of Book | Miles | Year | NADA Average Sales Price | Your Wholesale Price | Your Savings | Add to List |
|---|---|---|---|---|---|---|---|---|
| 2009 Cadillac CTS Exterior:Black Raven,Interior:Ebony, Ebony,Transmission:Automatic,Drive: Rear,Trim:Performance,Engine:3.0L... Stock#:2756079 Auction Page | | -$285 | 20,866 | 2009 | $30,550 | $29,023 | $1,527 | ☐ |
| 2010 Cadillac CTS Exterior:Radiant Silver,Interior: Ebony,Ebony,Transmission:Automatic, Drive:Rear,Trim:Performance... Stock#:3355164 Auction Page | | -$863 | 10,725 | 2010 | $29,800 | $28,310 | $1,490 | ☐ |
| 2009 Cadillac CTS Exterior:Black Raven,Interior:Cash- mere/Cocoa,Transmission:Automatic, Drive:All,Trim:Luxury,Engine:3.0L... Stock#:1263827 Auction Page | | $924 | 31,758 | 2009 | $29,575 | $28,096 | $1,479 | ☐ |
| 2010 Cadillac CTS Exterior:Black Raven,Interior:Ebony, Ebony,Transmission:Automatic,Drive: All,Trim:Luxury,Engine:3.0L... Stock#:3937830 Auction Page | | -$325 | 23,921 | 2010 | $29,125 | $27,699 | $1,456 | ☐ |
| 2010 Cadillac CTS Exterior:Black Ice,Interior:Ebony, Ebony,Transmission:Automatic,Drive: All,Trim:AWD/ISA,Engine:3.0L... Stock#:2142569 Auction Page | | -$254 | 24,857 | 2010 | $29,125 | $27,699 | $1,456 | ☐ |
| 2010 Cadillac CTS Exterior:Radiant Silver,Interior: Tan,Transmission:Automatic,Drive: Rear,Trim:RWDw/1SA,Engine:3.0L... Stock#:4819301 Auction Page | | -$1,374 | 30,443 | 2010 | $28,325 | $26,909 | $1,416 | ☐ |

*Fig. 19*

| | | | | | | | |
|---|---|---|---|---|---|---|---|
| | | Back of Book | Miles | Year | NADA Average Sales Price | Your Wholesale Price | Your Savings | Add to List |
| 2010 Cadillac CTS<br>Exterior:Black Raven,Interior:Ebony,<br>Ebony,Transmission:Automatic,Drive:<br>Rear,Trim:Performance,Engine:3.0L...<br>Stock#:4043979<br>Auction Page | -$2,144 | 33,064 | 2010 | $28,325 | $26,909 | $1,416 | ☐ |
| 2009 Cadillac CTS<br>Exterior:Radiant Silver,Interior:<br>Ebony,Ebony,Transmission:Automatic,<br>Drive:Rear,Trim:Performance...<br>Stock#:4510252<br>Auction Page | -$1,674 | 24,188 | 2009 | $26,900 | $25,555 | $1,345 | ☐ |
| 2010 Cadillac CTS<br>Exterior:Black Raven,Interior:Cash-<br>mere/Cocoa,Transmission:Automatic,<br>Drive:All,Trim:Luxury,Engine:3.0L...<br>Stock#:4819301<br>Auction Page | -$1,374 | 30,433 | 2010 | $28,325 | $26,909 | $1,416 | ☐ |
| 2010 Cadillac CTS<br>Exterior:Black Raven,Interior:Ebony,<br>Ebony,Transmission:Automatic,Drive:<br>All,Trim:Luxury,Engine:3.0L...<br>Stock#:3355164<br>Auction Page | -$863 | 10,725 | 2010 | $29,800 | $28,310 | $1,490 | ☐ |
| 2010 Cadillac CTS<br>Exterior:Black Ice,Interior:Ebony,<br>Ebony,Transmission:Automatic,Drive:<br>All,Trim:AWD/ISA,Engine:3.0L...<br>Stock#:3937830<br>Auction Page | -$325 | 23,921 | 2010 | $29,125 | $27,669 | $1,456 | ☐ |
| 2010 Cadillac CTS<br>Exterior:Radiant Silver,Interior:<br>Tan,Transmission:Automatic,Drive:<br>Rear,Trim:RWD/ISA,Engine:3.0L...<br>Stock#:2142569<br>Auction Page | -$254 | 24,857 | 2010 | $29,125 | $27,669 | $1,456 | ☐ |

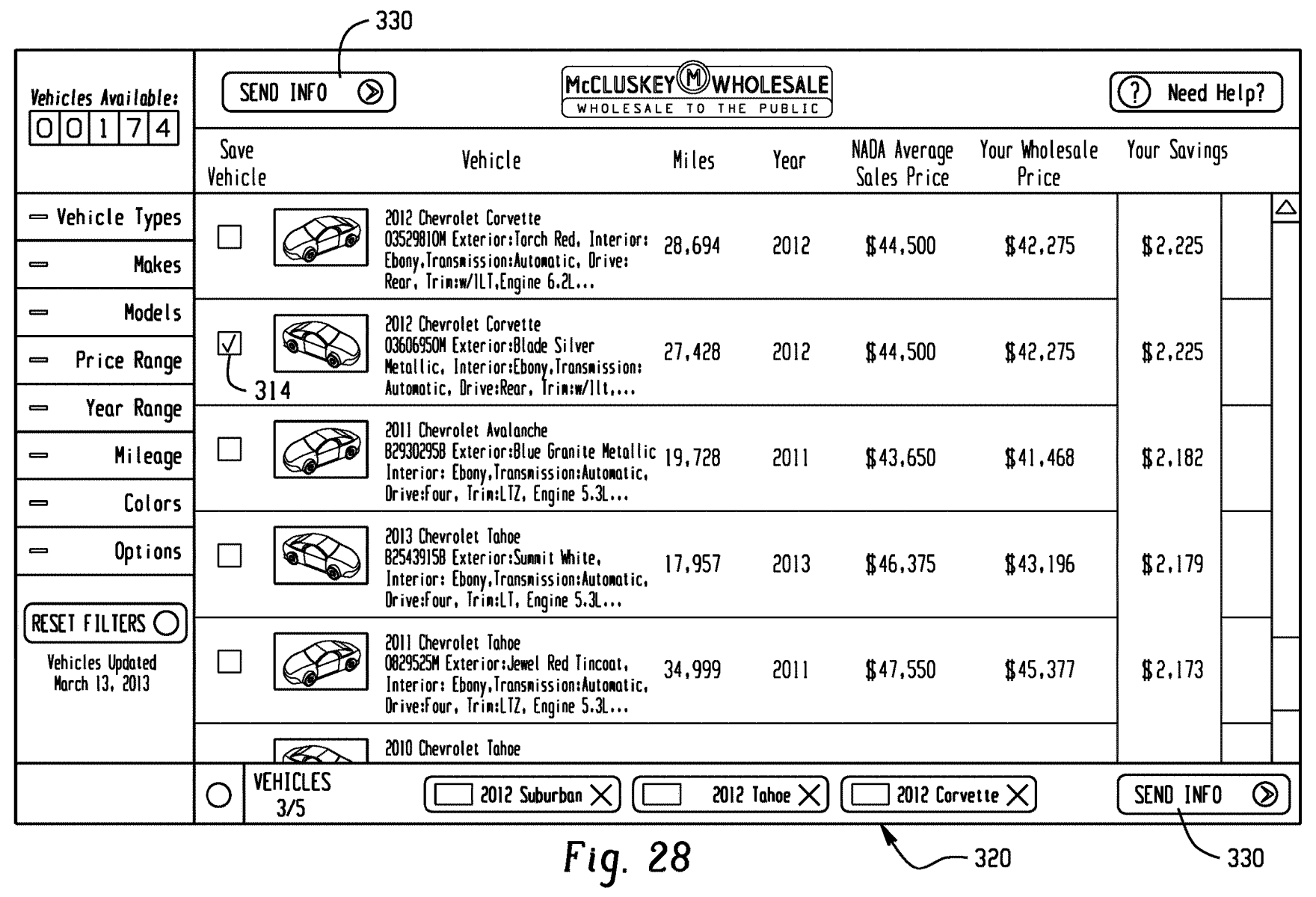

Vehicles Available: 0 0 1 7 4

SEND INFO — 330

McCLUSKEY WHOLESALE
WHOLESALE TO THE PUBLIC

Need Help?

| Save Vehicle | Vehicle | Miles | Year | NADA Average Sales Price | Your Wholesale Price | Your Savings |
|---|---|---|---|---|---|---|
| ☐ | 2012 Chevrolet Corvette 03529810M Exterior:Torch Red, Interior: Ebony,Transmission:Automatic, Drive: Rear, Trim:w/1LT,Engine 6.2L... | 28,694 | 2012 | $44,500 | $42,275 | $2,225 |
| ☑ — 314 | 2012 Chevrolet Corvette 03606950M Exterior:Blade Silver Metallic, Interior:Ebony,Transmission: Automatic, Drive:Rear, Trim:w/1Lt.... | 27,428 | 2012 | $44,500 | $42,275 | $2,225 |
| ☐ | 2011 Chevrolet Avalanche B2930295B Exterior:Blue Granite Metallic Interior: Ebony,Transmission:Automatic, Drive:Four, Trim:LTZ, Engine 5.3L... | 19,728 | 2011 | $43,650 | $41,468 | $2,182 |
| ☐ | 2013 Chevrolet Tahoe B2543915B Exterior:Summit White, Interior: Ebony,Transmission:Automatic, Drive:Four, Trim:LT, Engine 5.3L... | 17,957 | 2013 | $46,375 | $43,196 | $2,179 |
| ☐ | 2011 Chevrolet Tahoe 08295Z5M Exterior:Jewel Red Tincoat, Interior: Ebony,Transmission:Automatic, Drive:Four, Trim:LTZ, Engine 5.3L... | 34,999 | 2011 | $47,550 | $45,377 | $2,173 |
| | 2010 Chevrolet Tahoe | | | | | |

Vehicle Types
Makes
Models
Price Range
Year Range
Mileage
Colors
Options

RESET FILTERS

Vehicles Updated March 13, 2013

VEHICLES 3/5  ☐ 2012 Suburban ✕  ☐ 2012 Tahoe ✕  ☐ 2012 Corvette ✕ — 320

SEND INFO — 330

Fig. 28

| Vehicles Available: 0 0 1 7 4 | | McCLUSKEY Ⓜ WHOLESALE<br>WHOLESALE TO THE PUBLIC | | | | ? Need Help? | |
|---|---|---|---|---|---|---|---|
| | Save Vehicle | Vehicle | Miles | Year | NADA Average Sales Price | Your Wholesale Price | Your Savings |
| Vehicle Types | ☐ | 2012 Chevrolet Corvette<br>03529810M Exterior:Torch Red, Interior: Ebony,Transmission:Automatic, Drive: Rear, Trim:w/1LT,Engine 6.2L... | 28,694 | 2012 | $44,500 | $42,275 | $2,225 |
| Makes | | | | | | | |
| Models | ☑ | 2012 Chevrolet Corvette<br>03606950M Exterior:Blade Silver Metallic, Interior:Ebony,Transmission: Automatic, Drive:Rear, Trim:w/1lt,.... | 27,428 | 2012 | $44,500 | $42,275 | $2,225 |
| Price Range | | | | | | | |
| Year Range | ☐ | 2011 Chevrolet Avalanche<br>B2930295B Exterior:Blue Granite Metallic, Interior: Ebony,Transmission:Automatic, Drive:Four, Trim:LT, Engine 5.3L... | 19,728 | 2011 | $43,650 | $41,468 | $2,182 |
| Mileage | | | | | | | |
| Colors | ☐ | 2013 Chevrolet Tahoe<br>B2543915B Exterior:Summit White, Interior: Ebony,Transmission:Automatic, Drive:Four, Trim:LT, Engine 5.3L... | 17,957 | 2013 | $46,375 | $43,196 | $2,179 |
| Options | | | | | | | |
| | ☐ | Tahoe<br>$52,511<br>18,169 Miles or:Jewel Red Tincoat, Interior: Silver Ice ,Transmission:Automatic, Metallic, Interior: Ebony, m:LTZ, Engine 5.3L... Transmission:Automatic, Drive:Four, Trim:LTZ,... | 34,999 | 2011 | $47,550 | $45,377 | $2,173 |
| RESET FILTERS ⊙ | ☐ | Tahoe | | | | | |

VEHICLES 3/5    ☐ 2012 Suburban ✕    ☐ 2012 Tahoe ✕    ☐ 2012 Corvette ✕

Vehicles Updated March 13, 2013

| | Selection | Quick Filter [Chevrolet Camaro] | Miles | Year | Price |
|---|---|---|---|---|---|
| ☑ 420 | (VEHICLE PHOTO HERE) | 2017 Chevrolet Camaro ZL1  B22285LB<br>Engine:  Trans: Manual  Drive: Rear<br>Ext: Red  Int: N/A  Options: Nav | 4,263 | 2017 | $56,627 |
| ☐ | (VEHICLE PHOTO HERE) | 2017 Chevrolet Camaro SS  Z28668HB<br>Engine:  Trans: Manual  Drive: Front<br>Ext: Red  Int: N/A  Options: | 1,810 | 2017 | $56,436 |
| ☐ | (VEHICLE PHOTO HERE) | 2015 Chevrolet Camaro Z28  U77740RB<br>Engine: 7.0L  Trans: Manual  Drive: Rear<br>Ext: Red Hot  Int: Black  Options: | 12,354 | 2015 | $51,141 |
| ☑ 420 | (VEHICLE PHOTO HERE) | 2015 Chevrolet Camaro ZL1  U44210IB<br>Engine: 6.2L  Trans: Manual  Drive: Rear<br>Ext: Red Hot  Int: Black  Options: Nav | 7,941 | 2015 | $51,010 |
| ☐ | (VEHICLE PHOTO HERE) | 2014 Chevrolet Camaro ZL1  547616K3<br>Engine: 6.2L  Trans: Automatic  Drive: Rear<br>Ext: Crystal Red  Int: Black  Options: Nav | 2,048 | 2014 | $50,049 |

SYSTEM AND METHOD FOR AGGREGATING USED VEHICLE DATA AND PRESENTING USED VEHICLES FOR SALE

CROSS-REFERENCES

This application is a continuation-in-part of U.S. application Ser. No. 13/838,439, filed Mar. 15, 2013, which in turn claims the benefit of U.S. Provisional Application Ser. No. 61/728,042, filed Nov. 19, 2012, which is incorporated herein by reference.

TECHNICAL FIELD

This application relates generally to the field of used vehicle sales and, more specifically, to a system and method for providing dealerships and consumers with access to an expanded used vehicle inventory based upon vehicles that are up for auction by numerous selling entities at numerous locations.

BACKGROUND

In the used vehicle market, used vehicle dealers generally have difficulty maintaining the proper used vehicle inventory that will best match the needs of a potential vehicle purchaser. Certain vehicles held by the used vehicle dealership may sell quickly, other vehicles may never sell at retail. If a potential buyer desires a specific vehicle that is not in inventory, the dealer may check the inventories of other local dealers etc., but generally that process is cumbersome, does not provide ready access to a large used vehicle inventory and results in the dealer attempting to persuade the customer to consider another vehicle that is in fact in the dealer's limited inventory.

In order to provide a potential large used vehicle inventory, nationwide used vehicle chains, such as CARMAX and AUTONATION have been established, with multiple large used vehicle lots located across the country. Still, this business model requires a large up front investment in facilities as well as the purchase and maintenance of a very large used vehicle inventory that depreciates daily.

When a dealer has used vehicles it is unable to sell direct to consumers in its market, the dealer commonly lists such vehicles for auction via nationwide electronic auction sites such as SmartAuction, which is operated by Ally Financial, OVE.com, which is operated by Manheim, or Openlane.com, or takes the vehicles to a physical auction such as may be operated by Manheim or Adessa Auto Auction. Using these auction systems, dealers can sell used vehicles to, and buy used vehicles from other dealers in an automated manner. In fact, many dealers currently utilize these auction sites to manage their used vehicle inventories. However, such management still involves trying to identify and buy used vehicles to place on the dealer's lot for potential future sale.

It would be desirable to provide consumers with access to a large used vehicle inventory, including vehicles owned by multiple selling parties (e.g., dealers, banks, credit unions and manufacturers, or in some cases inclusive of individuals) across the country, without requiring a substantial over-investment in locations and/or used vehicle inventory and/or wasting money to transport the vehicle unnecessarily.

SUMMARY

In one aspect, a computerized system collects used vehicle data regarding vehicles available for sale from numerous dealers (e.g., as from a vehicle auction system), and modifies and supplements such vehicle data for presentation to the consuming public in a searchable manner such that a single entity (e.g., a specific dealer) can offer all of the vehicles for sale to consumers.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 3-16 show web page views from a searchable vehicle web site;
FIGS. 17-23 show web page views accessible via a dealer login version of the site;
FIGS. 26-30 show an alternative variation of web pages providing additional functionality;
FIGS. 31-40 show one system with associated CRM connected functions and related web page interface screens presented.

DETAILED DESCRIPTION

Figure 1:
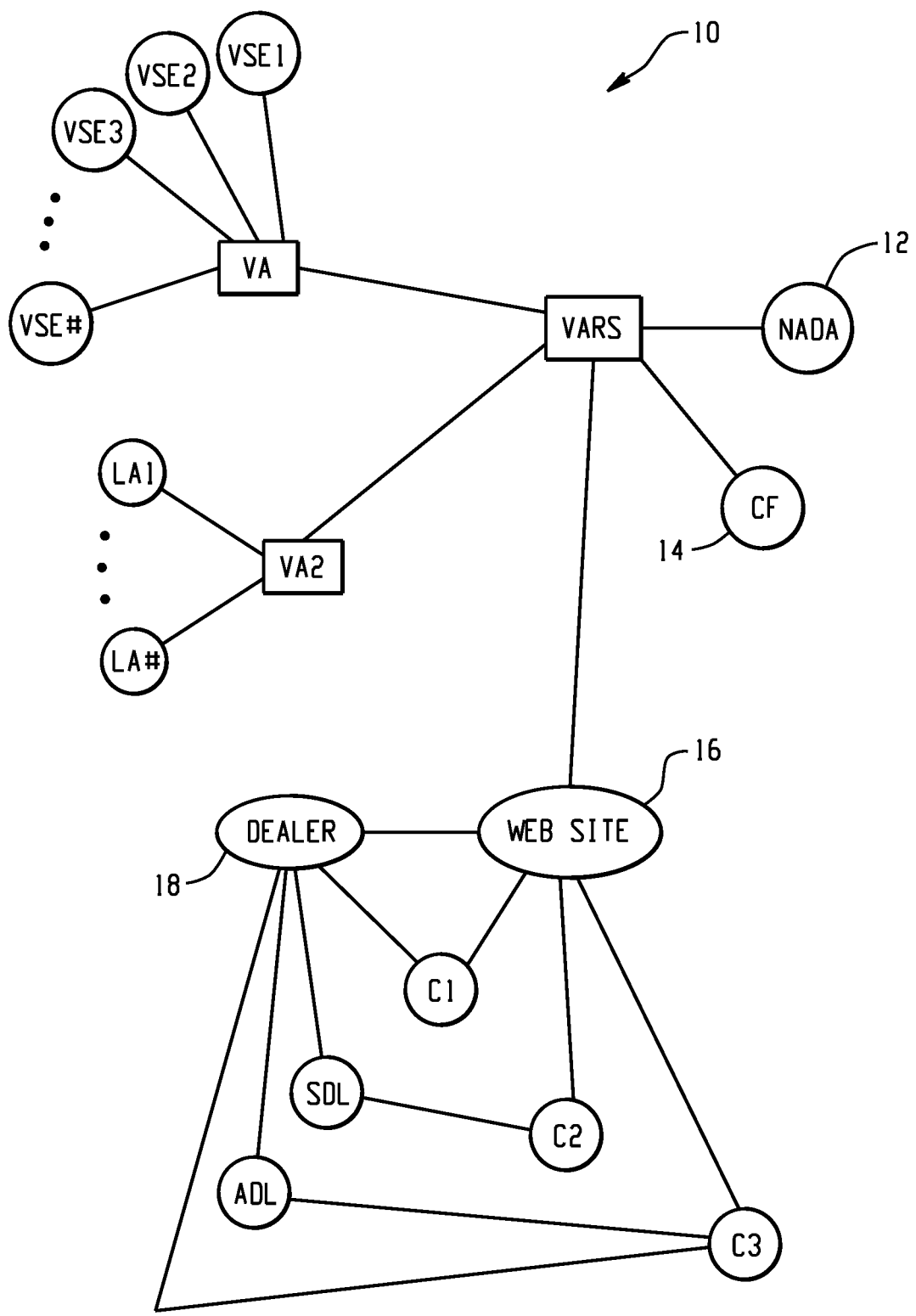
FIG. 1 is schematic depiction of a computerized system.

Referring to FIG. 1, a schematic depiction of one embodiment of a computerized system 10 that may be used in carrying out the claimed invention is shown and includes a vehicle auction computer system VA to which numerous Vehicle Selling Entities VSE1, VSE2, VSE3 . . . VSE # have access and can upload vehicle data for vehicles the VSEs desire to sell at wholesale auction, as well as access vehicle data for vehicles available for purchase at wholesale auction. In this regard, the VA generally maintains a database of vehicles available for auction and, in connection with each such vehicle, includes associated data such as VIN, make, model, year, color, trim level and/or accessories, mileage, location, damage estimate, vehicle images/photos, required opening bid, current bid and, in many cases, a buy now price. The database is searchable by wholesale purchasers (e.g., vehicle dealerships, not consumers) via a web site interface and dealers can also submit bids etc. via the interface. It is understood that multiple vehicle auction computer systems (e.g., for different vehicle auction sites) may be used in the system (e.g., per the illustrated additional vehicle auction system VA2). A given vehicle auction system, such as VA2, may also act as an aggregator of vehicles being auctioned by multiple, typically smaller and local auction entities (e.g., per LA1 through LA #).

A Vehicle Aggregation and Redistribution System (VARS) is connected to the vehicle auction system VA and receives a download of the VA vehicle database data. In various examples, the vehicle database data can be (i) e-mailed to the VARS in a comma-delimited format or (ii) electronically transferred via a secure FTP Process in formats such as comma-delimited files. The VARS is responsible for multiple calculations and table look-ups, then organizing and supplementing the vehicle database data into a new database of accessible and searchable information. For this purpose, the VARS also has access to other data, such as NADA sales data 12, CarFax data 14 and zip code files. In the present case such supplemental data may be accessible from respective NADA and CarFax computer systems or may be previously obtained and stored in an accessible data storage forming part of the vehicle aggregation and redistribution system VARS. Moreover, the NADA data may actually be included in the vehicle data that is provided by the vehicle auction system VA. The VARS carries out a sequence of operations to reorganize and supplement the data received from the VA.

More specifically, the VARS carries out the following operation to provide a dealer and consumer friendly platform that enables a single dealer to offer and present all of the vehicles for sale to end customers, even though the dealer does not yet own the vehicles being offered. In this regard, a sophisticated pricing strategy is carried out by the VARS to properly price vehicles for sale to end customers in a manner that assures a profit for the dealer and enables the end customer to easily evaluate the deal it is obtaining. The starting point for the pricing model is the price that will be required for the dealer to purchase the vehicle at auction (the dealer purchase price or DPP). Where the particular vehicle has a buy now price, the buy now price may be set as the DPP. Where the particular vehicle does not have a buy now price, the VARS calculates a DPP in accordance with a pre-established algorithm. For example, the DPP may automatically be set to the opening bid price plus a specified amount, where the specified amount is defined (i) according to the average sales price over opening bid historically for the auction site or (ii) according to some other rule. Once the DPP price has been set, the VARS must build in various other costs to the dealer.

One significant factor in cost to the dealer is location of the vehicle being auctioned. A vehicle that is only 50 miles away from the ultimate consumer sales location will incur one delivery cost, while a vehicle that is 1,000 miles away from the ultimate consumer sales location will incur a higher delivery cost. In one implementation, the VARS determines the delivery distance by comparing the zip code of the selling dealer (i.e., the dealer that put the vehicle up for auction) to the zip code of the dealer that would purchase the vehicle at auction (the purchasing dealer). In another implementation, the VARS determines the delivery distance by comparing the zip code of the selling dealer to the zip code of an end consumer (e.g., as may be input by the consumer or as may be automatically determined according to Google Pay-Per-Click campaign if one was to drive the traffic, or a visitor's geo-positioning based on the IP Address provided to the visitor by their Internet Service Provider). In either case, the determined distance may be multiplied by a known cost per mile (e.g., 75 cents/mile) for delivery to determine the delivery cost (the vehicle transport fee or VTF).

Another potentially significant cost to the dealer is the cost to repair the disclosed damage. As noted above, the data available from the vehicle auction system typically includes such value, and it can be incorporated directly into the pricing as a damage repair cost or DRC. The DRC can be set exactly according to the data received from the vehicle auction system, or an adjustment could be made (e.g., building in a five or ten percent cushion).

Regardless of whether the vehicle has any damage, the purchasing dealer typically needs to perform a vehicle detailing and prep operation (e.g., thorough cleanup, oil change, safety inspection), which is another cost to the retailing dealer. The VARS may use a pre-established cost for this pricing component (the vehicle prep price or VPP).

Finally, there is a purchasing dealer cost associated with each purchase made via the vehicle auction system. The purchaser must pay that fee to the vehicle auction system operator. That cost is generally a pre-established and fixed fee, but could also be a percentage of the auction sales price. In either case, the fee (known as the buy fee or BF) must also be factored into the purchasing dealer cost.

Thus, from the above, the VARS can determine the actual cost for the vehicle (or ACV) as:

$$ACV=DPP+VTF+DRC+VPP+BF$$

Once the ACV is established, the VARS can then price the vehicle for sale to the consumer according to predefined logic. In this regard, while goals of the present system and method include to assure that the purchasing dealer makes an acceptable profit and to try and provide the consumer with an attractive price. In one implementation, the profit is defined according to one of several possibilities. Specifically, the VARS may utilize (i) a predefined base profit (i.e., specified $), (ii) a percent mark-up over the ACV or (iii) a profit established according to savings (e.g., percent or dollar value) as compared to the average retail value or ARV for the vehicle. Thus, the VARS may perform a number of calculations to determine a final vehicle offer price or VOP.

$$VOP1=ACV+\$AMOUNT$$

$$VOP2=ACV\times1.1$$

$$VOP3=0.90\times ARV$$

or $$VOP3=ARV-\$500$$

It is contemplated that the VARS will select highest dollar value from among VOP1, VOP2 and VOP3 and set it as the actual VOP. In this manner, (1) the purchasing dealer will always be assured of profiting by at least a specified dollar amount because VOP1 will be selected if VOP2 and VOP3 are lower than VOP1, (2) the purchasing dealer will be assured of making at least a specified percentage profit any time VOP1 is not the largest amount and (3) without passing up the opportunity for a larger profit, the purchasing dealer will be assured of being able to present the consumer with a truly fair price even if the purchasing dealer is making a large profit because the ACV happens to calculate out to be significantly lower than the average retail value ARV.

With respect to the above analysis, the average retail value ARV should be from a trusted, consumer accepted source. For example, NADA average retail value may be used. In this regard, the VARS not only utilizes the ARV in connection with setting the pricing, but also uses the ARV to establish a data set the reflects the value of the VOP to the consumer by comparing the VOP to the ARV. Thus, if the VOP for a vehicle is $9,100 and the ARV is $10,100, then the VARS establishes a consumer savings value of $1,000 for the vehicle ($10,100–$9,100). Of course, the consumer savings value may not always be positive. For example, if the VOP is $10,975 and the ARV is $10,400, then the consumer savings value would be –$575. Regardless, the consumer savings value (or CSV) established by the VARS can be a useful tool to demonstrate to a consumer that a particular VOP represents a good price/value or a great price/value, as will be demonstrated below. A negative CSV represents a price over the ARV, while a positive CSV represents a price below the ARV. Typically vehicles with a negative CSV may represent vehicles in mint condition or having colors or other features that make the vehicles more desirable than average.

Figure 2:
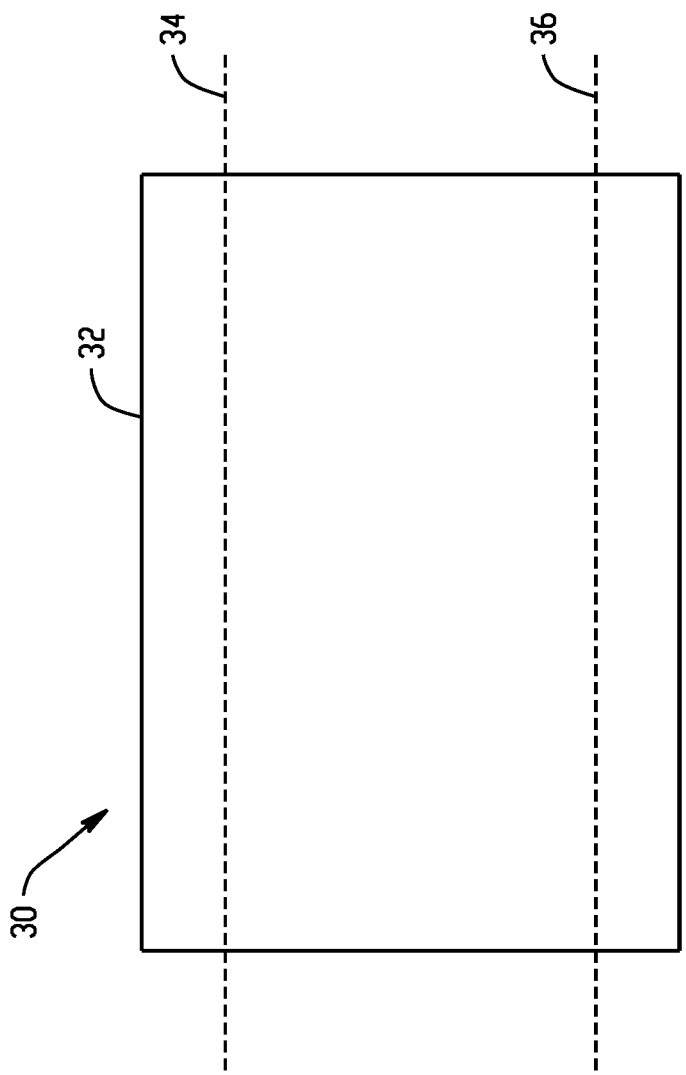
FIG. 2 is a schematic depiction of a vehicle image format.

In addition to analyzing and supplementing the date from the VA system to establish the VOP and CSV, the VARS also performs an image modification on the vehicle image/photo. Specifically, and referring to the schematic image depiction 30 of FIG. 2, the image received from the VA system is cropped to a standard relative height and width and resized to thumbnail to allow for faster loading of search results with only a small thumbnail next to each vehicle listing. The received image size is reflected by border 32. Typically, selling dealers submit the vehicle images with upper or lower banners (either inserted in the image or as an original part of the image because of signage that was behind the vehicle when the photo/image was captured) that identify the selling dealer. In the case of the present system, it is desired for that information to not appear in the images that are ultimately presented to consumers searching for vehicles. Accordingly, the VARS carries out an automatic cropping operation on the photo. For example, the VARS may automatically crop the top and bottom portions of the image 30 at the locations represented by dashed lines 34 and 36. In the majority of cases this cropping operation will result in removal of the selling dealer information from the image.

The VARS may also pre-filter the vehicle data to eliminate vehicles that are unlikely to be sold to consumers because the VOP is too far above the ARV. For example, if a particular vehicle VOP is simply too high (e.g., VOP higher than the ARV by a certain $ amount or certain %), or if a vehicle has too much current damage (e.g., DRC greater than a certain $ amount), then the VARS will kick the vehicle from the data set. Likewise, in some implementations, the VARS may automatically check the car fax report for each vehicle and if the vehicle has been (i) totaled or retitled, (ii) involved in more than X number of accidents or (iii) involved in an accident with more than Y $ of damage, the VARS may automatically kick the vehicle from the data set. Other factors could be developed and used to eliminate vehicles from the consumer searchable data set.

Referring again to FIG. 1, the VARS organizes the original, modified and supplemented vehicle data into a database that can be presented for easy consumer searching via a web site 16. In one implementation, the database is organized and presented to consumers in a spreadsheet type format as will be described below.

The web site 16 may be under the control of the purchasing dealer 18, whose personnel can also search the database. In one implementation, the dealer personnel may use a specific access login that gives them access to information over and above that which the consumers C1, C2 etc. can access, but this feature is not a required part of the system. For example, the VARS may also automatically calculate the dealer profit (or DP) on each vehicle, that is VOP−ACV, and present that data in a separate search result field for searches conducted via the dealer access login, but not for searches conducted by consumers without the dealer login.

Figure 3:
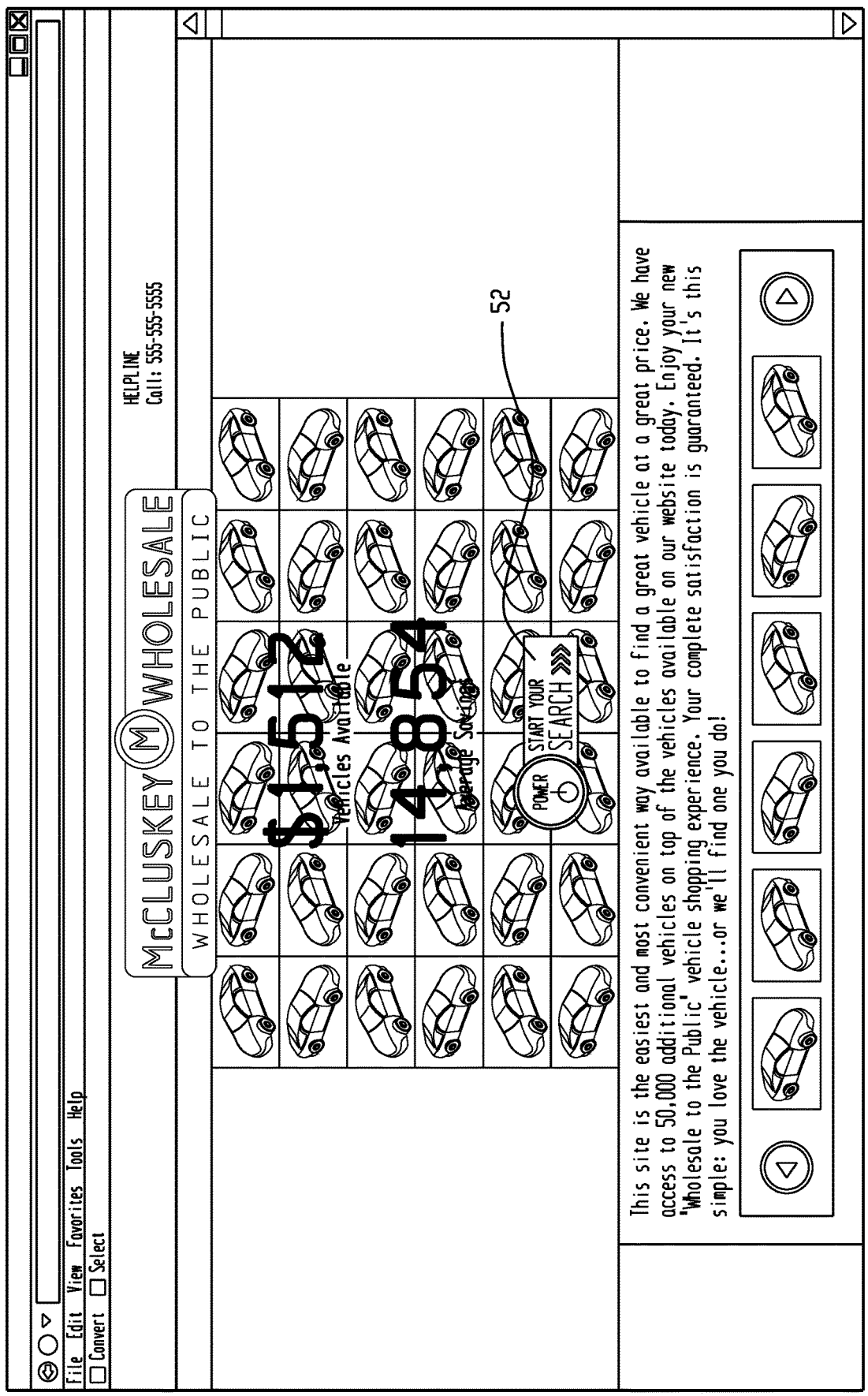

Referring now to FIGS. 3-17, the operation of the web site 16 is now described. A start page 50 for the site is shown in FIG. 3 and includes some basic description information and a graphical "Start Your Search" button 52. When the start your search button 52 is selected, the system performs a data search and load operation. The purpose of the data search and load operation is to assure that the most up to date vehicle data is used, as it is possible that at any point in time vehicles that were listed for sale by the VA site may have been sold or pulled from the VA. In addition, the data search/load operation may be used for the purpose of recalculating the VOP in those implementations where the consumer location (rather than location of dealer 18) is used to determine the VOP. In one implementation of such an embodiment, the VARS automatically determines whether the consumer accessing the site is more than a predetermined distance from the location of the dealer 18 (e.g., more than 100 miles) and, if so, the VARS utilizes the consumer location as the delivery location to determine the VOP. If not, the VARS automatically utilizes the VOP determination according to the location of dealer 18.

Figure 4:
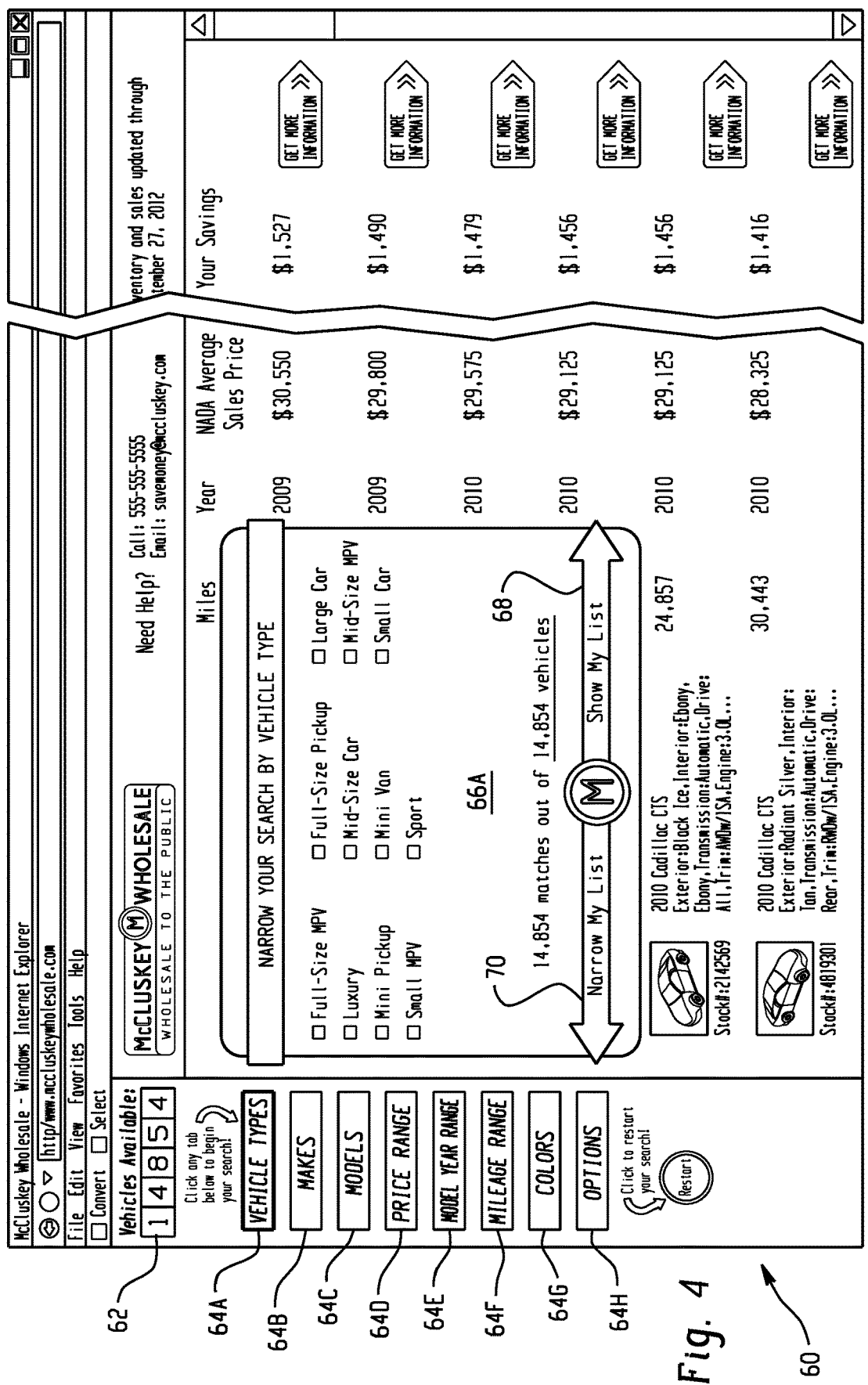
Figure 5:
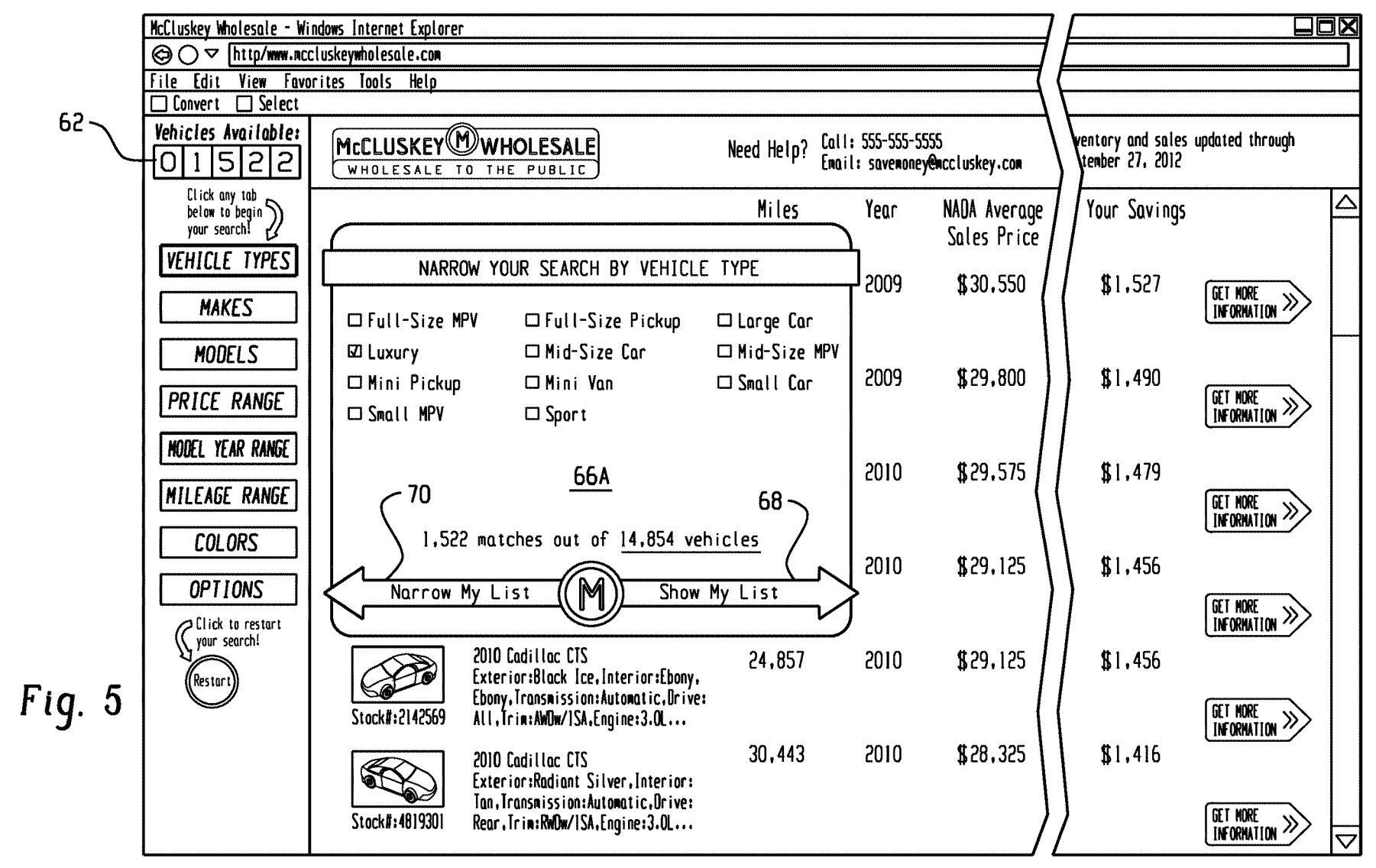

Once the data is ready to be searched, the consumer is presented with the search page 60 shown in FIG. 4. Notably, the page shows the total number of vehicles available in an odometer-style graphic 62 and presents search refinement categories 64A-64H that can be selected by the user to narrow down the choices to more exact matches of the vehicle they desire. The Vehicle Types category 64A may be automatically active upon initial presentation of page 60, resulting in the pop-up frame 66A that includes a variety of vehicle types (e.g., each of the industry standard vehicle types) that can be selected by the consumer in a check the box fashion. As demonstrated in FIG. 5, when a vehicle type box is selected (e.g., in this case the Luxury type), the odometer graphic 62 automatically lowers to the number of vehicles that match that selection, as does the match count shown in frame 66A. At any time, the consumer can select the Show My List graphic 68 to see the list of vehicles or continue to narrow their list by choosing any one of the other tabs 64B to 64H (as suggested by the Narrow My List arrow graphic 70).

Figure 6:
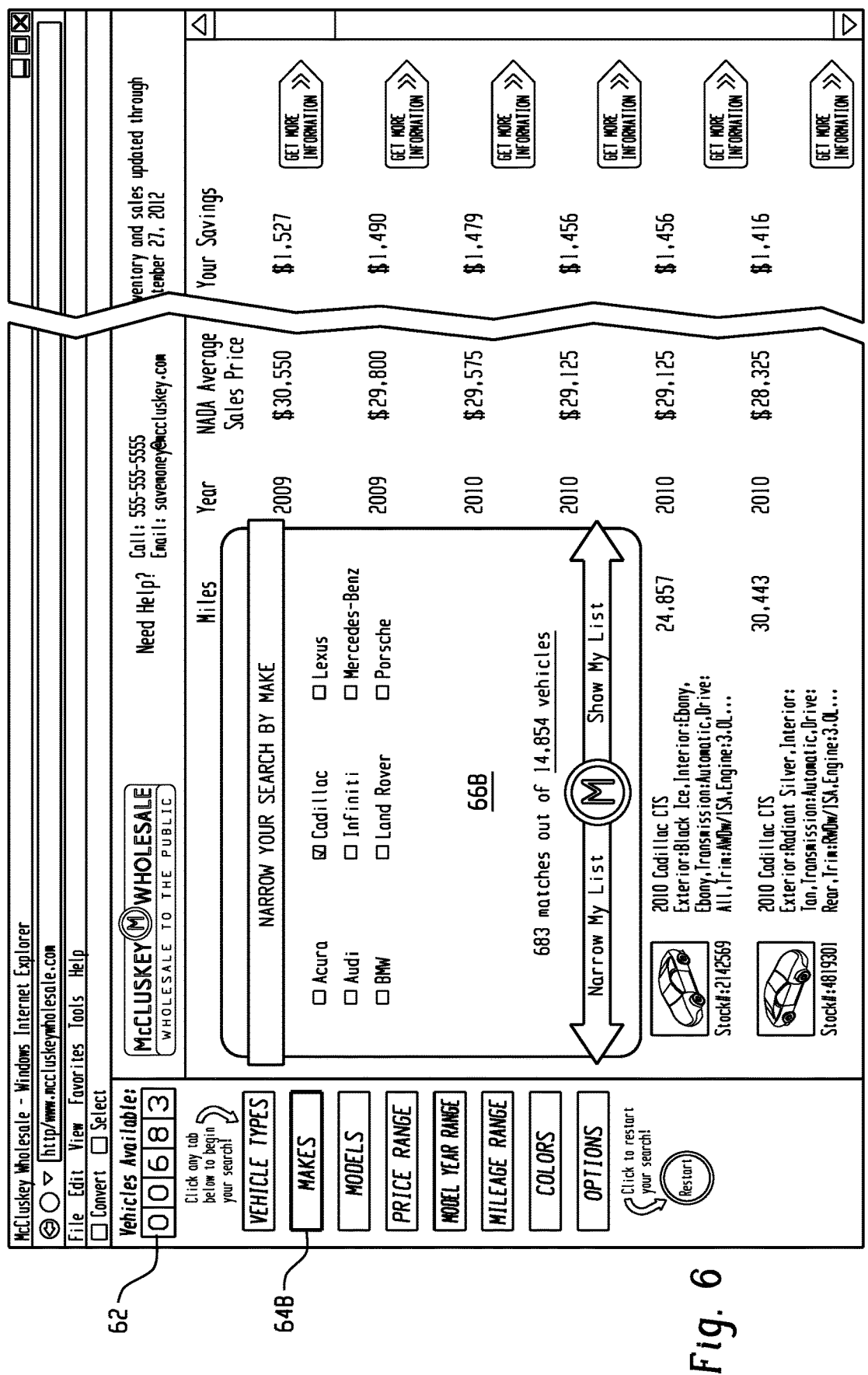
Figure 8:
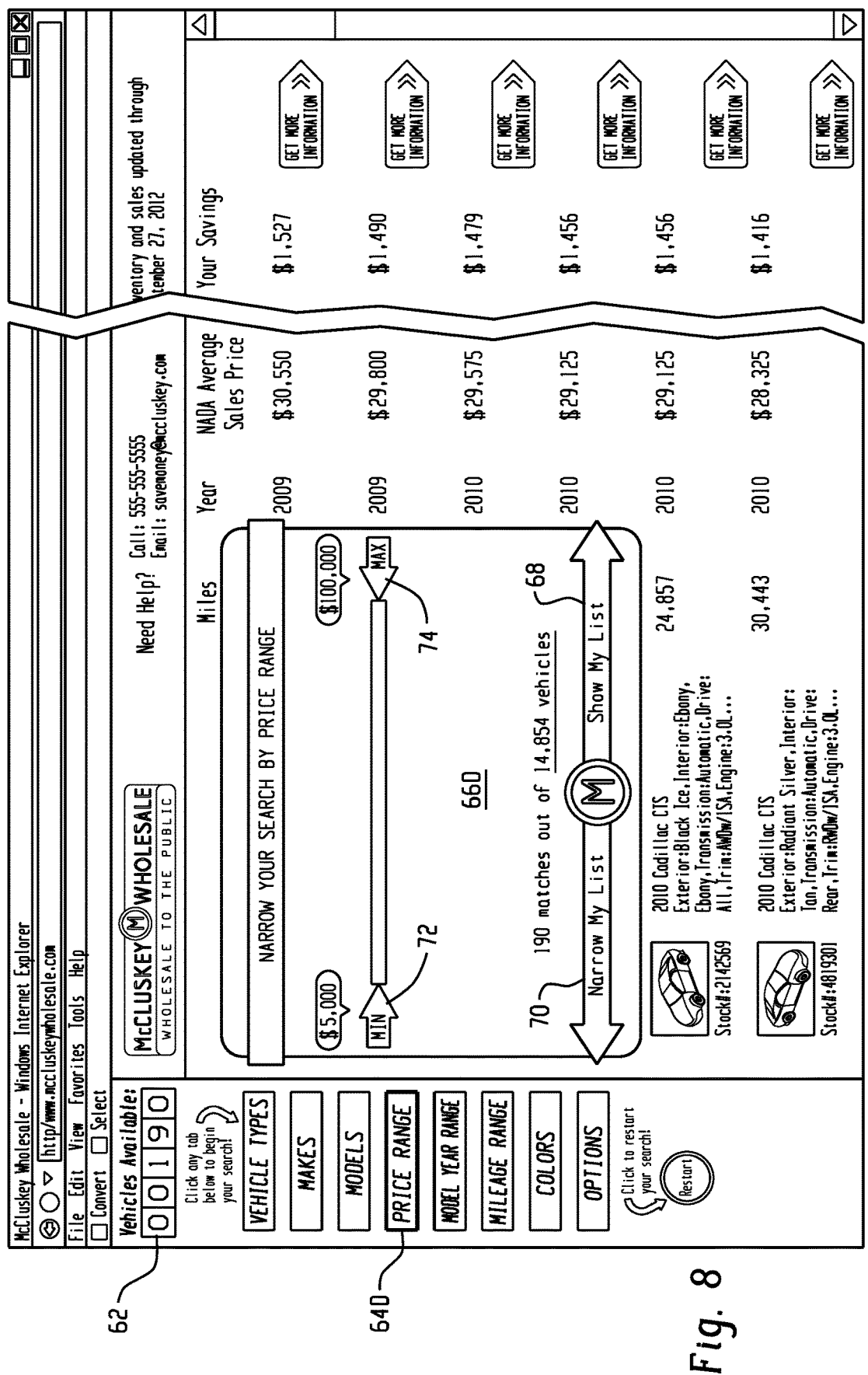
Figure 9:
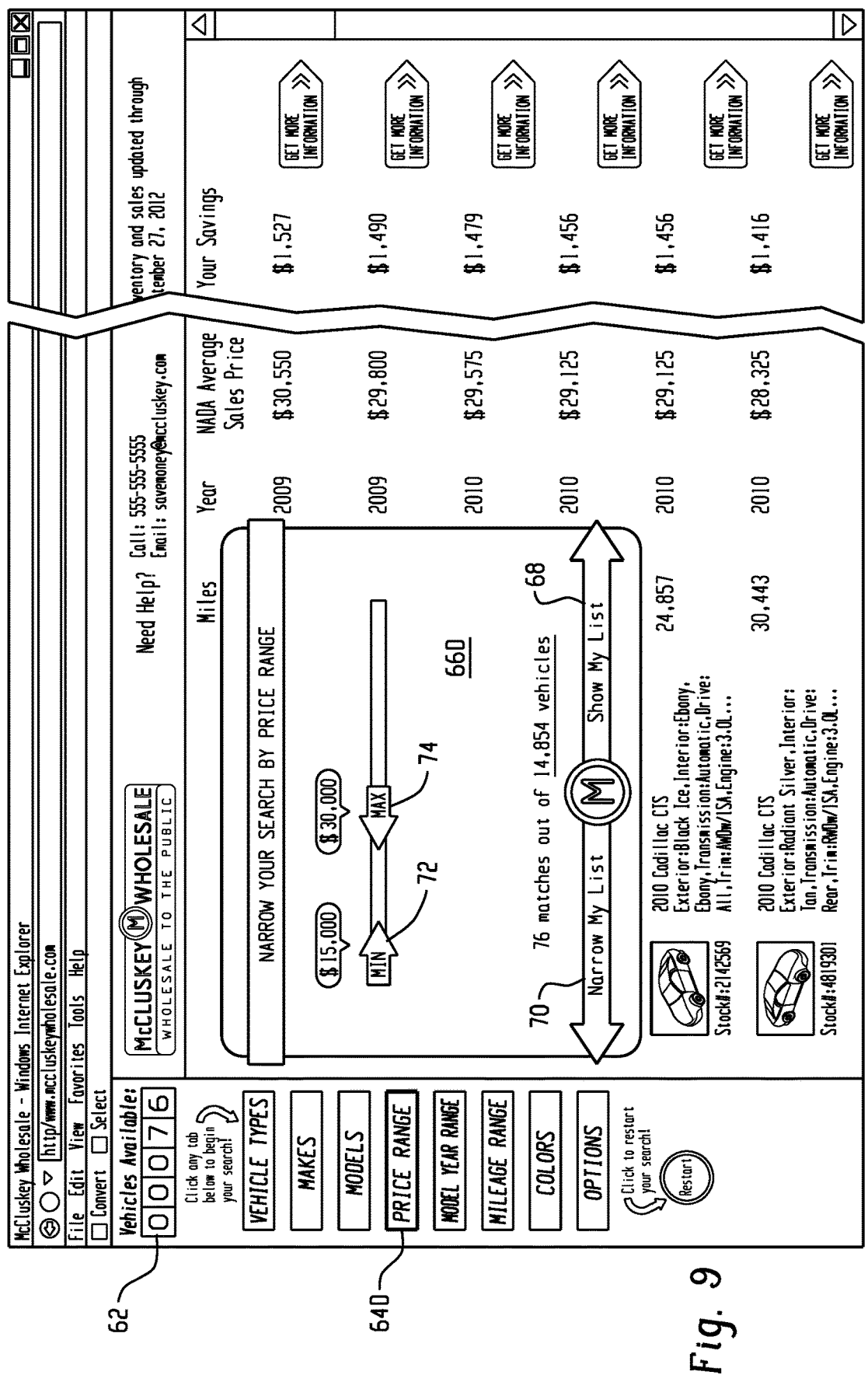
Figure 10:
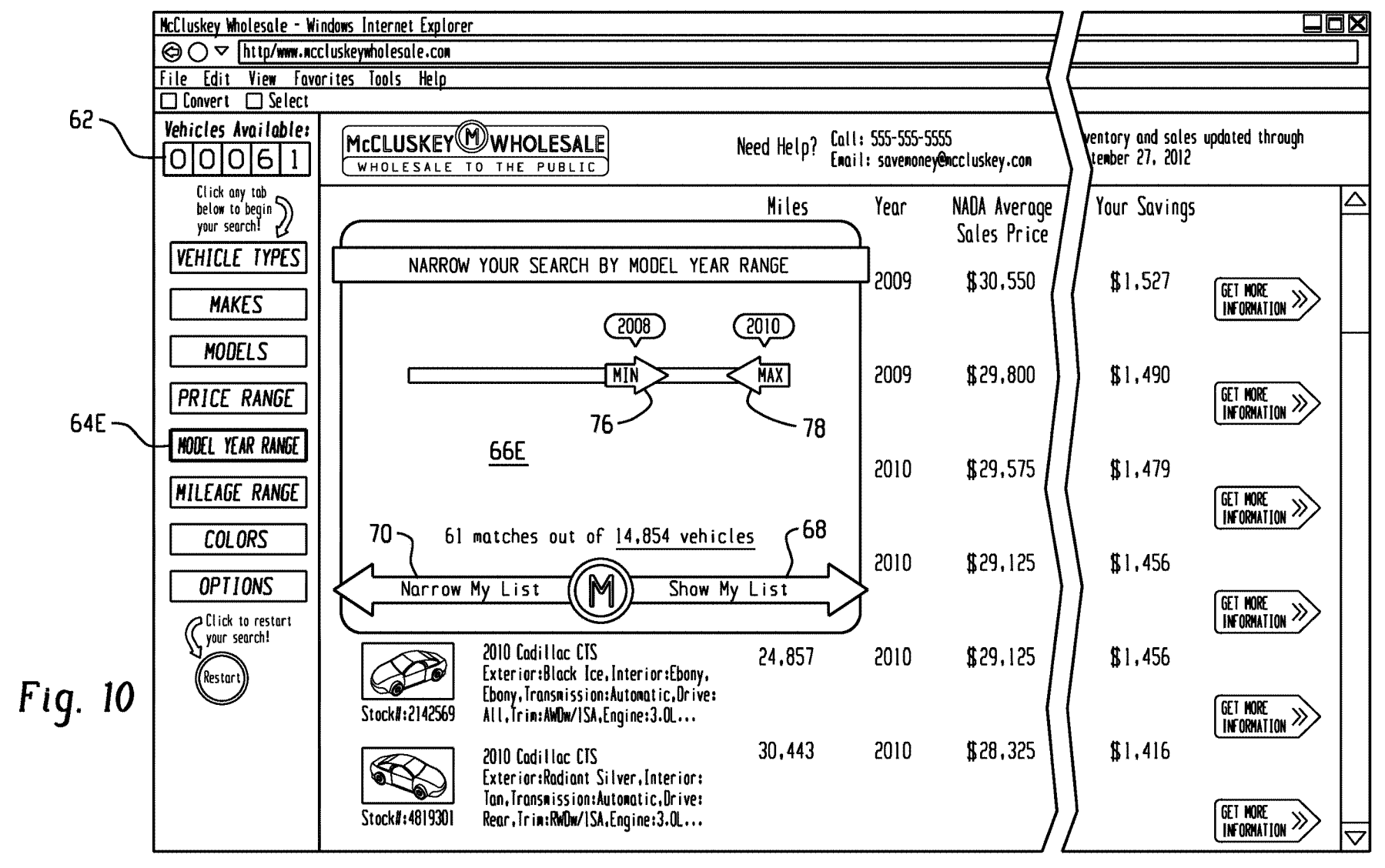
Figure 11:
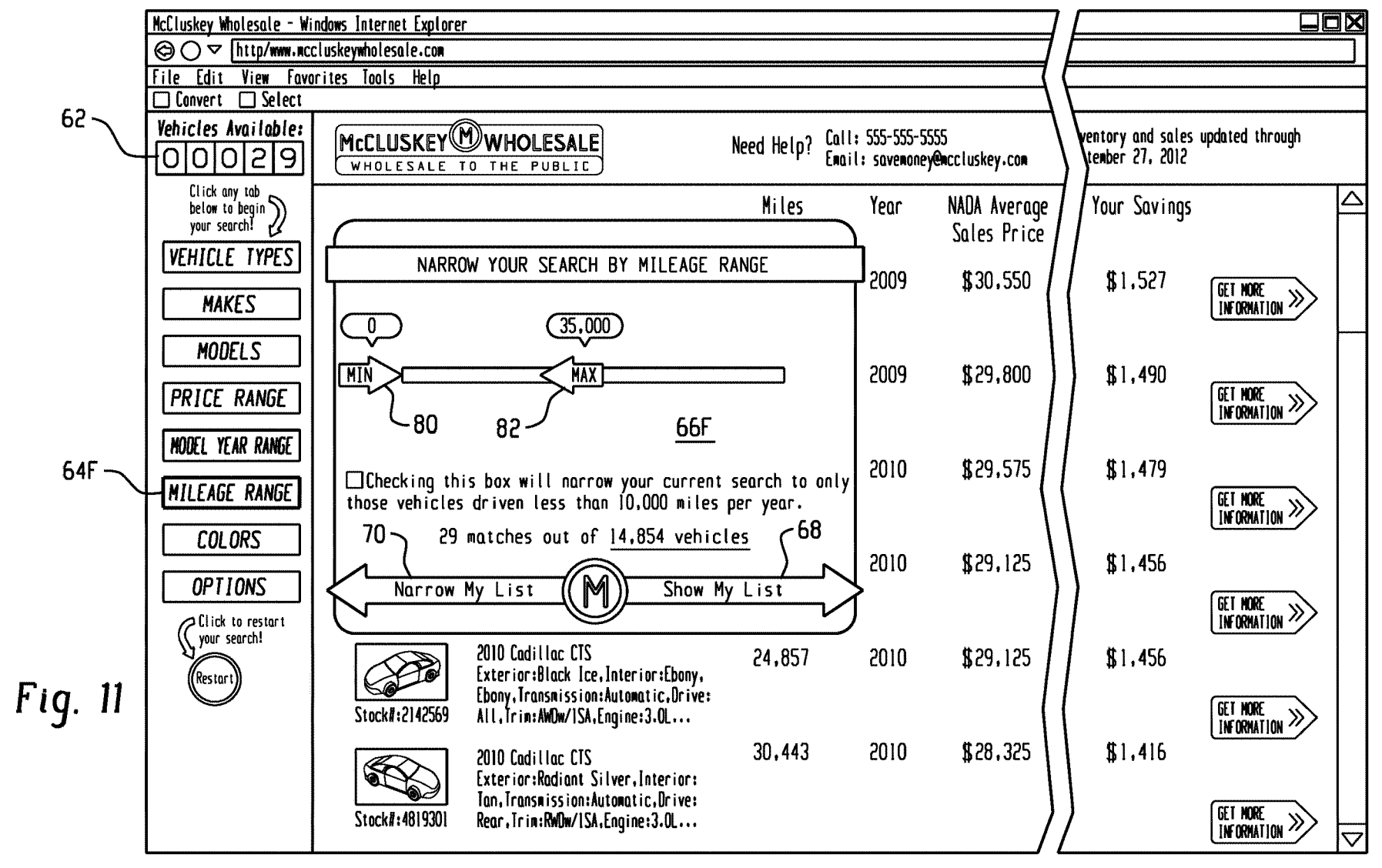
Figure 13:
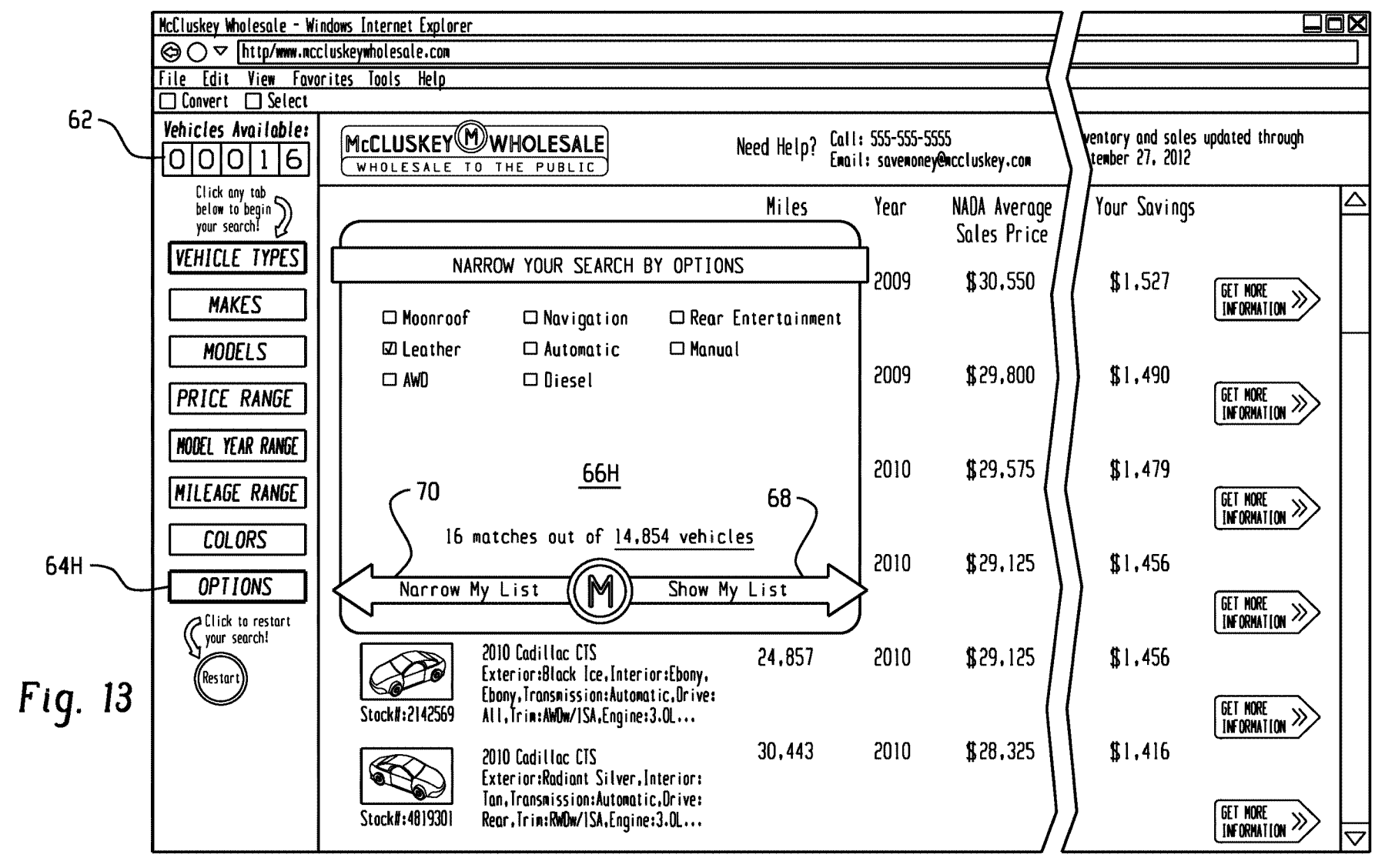

FIG. 6 shows the pop-up frame 66B based upon selection of the Makes category 64B (note that only luxury Makes show up in frame 66B since that was the only type selected in previous step). Again, when a make is selected (e.g., in this case Cadillac only) the odometer graphic 62 continues its drop to represent the number of matching vehicles. FIG. 7 shows the pop-up frame 66C based upon selection of the Models category 64C (note that only Cadillac's models are shown in frame 66C consistent with the previous Make selection). FIGS. 8 and 9 show the pop-up frame 66D based upon selection of the Price Range category 64D. As shown in FIG. 8, the box 66D initially shows a full price range, with MIN and MAX slide graphics 72 and 74 available for user selection and adjustment along the price scale. When the user adjusts the slides per FIG. 9, the odometer graphic again reduces according to the number of matching vehicles. FIG. 10 shows the pop-up frame 66E based upon selection of the Model Year Range category 64E, with MIN and MAX slide graphics 76 and 78 available for the consumer to move in order to refine the year range. FIG. 11 shows the pop-up frame 66F corresponding to selection of the Mileage Range category 64F, again with MIN and MAX slide graphics 80 and 82. Frame 66F also provides a box that can be selected to narrow the search to only low mileage vehicles (e.g., vehicles that have been driven less than 10,000 miles per model year old). FIG. 12 shows the pop-up frame 66G based upon selection of the Colors category 64G, with color selection boxes provided in the frame. FIG. 13 shows the pop-up frame 64H based upon selection of the Options category 64H.

Figure 14B:
Figure 14C:
Figure 15:
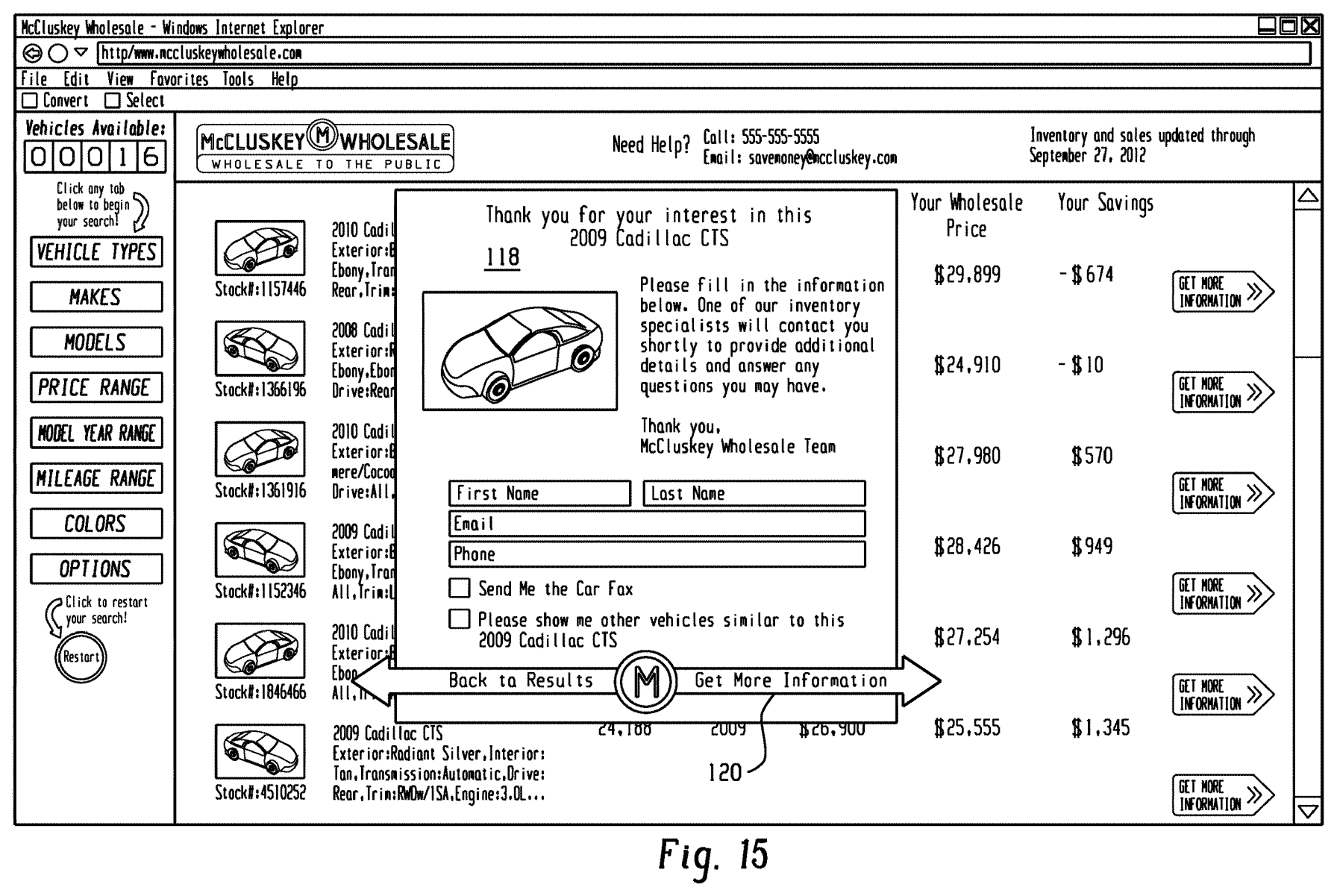
Figure 17:
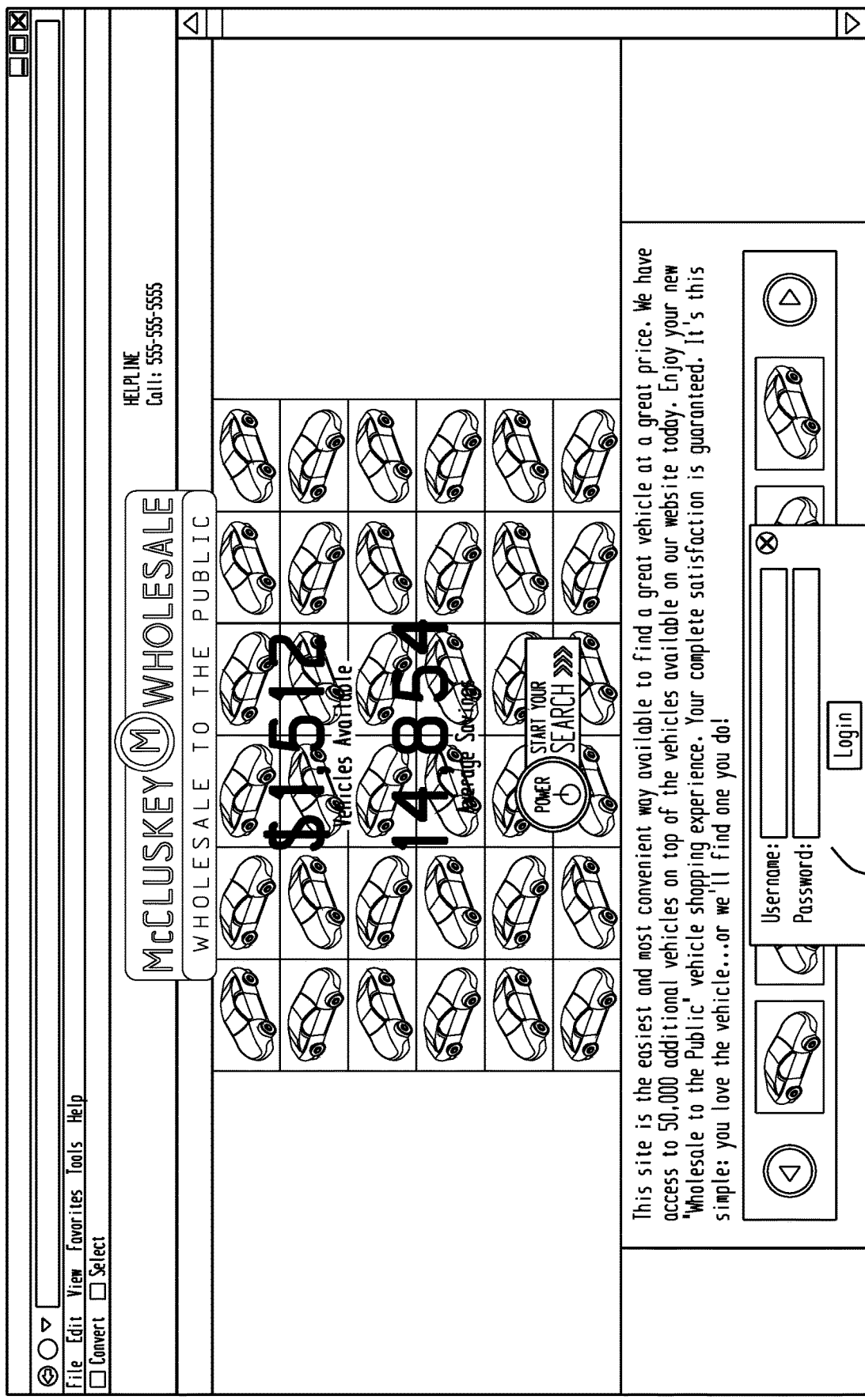

FIGS. 14A-14B show a vehicle search results page 100. Each vehicle is presented with vehicle image 102 (e.g., cropped per the action of the VARS), vehicle description 104, mileage 106, year 108, NADA average retail price 110, the offer price or VOP 112 and the consumer savings or CSV 114. In this case the full 16 matching vehicle results are not displayed on the screen at the same time, but the user can use the vertical slide button 115 to move up and down through the results per FIGS. 14B and 14C. A "Get More Information" graphic 116 is also provided for each vehicle result. When a consumer selects the graphic 116, a pop-up frame 118 (per FIG. 15) is presented to the consumer, where the consumer enters name, e-mail and phone information. The consumer can also request a CarFax report by checking the appropriate box and/or authorize the presentation of other vehicles similar to the one in which they are interested. When the consumer selects the get more information graphic 120, the consumers data is sent to the dealer 18 (see FIG. 1) so that dealer personnel can follow-up with the consumer (e.g., by e-mail or phone). For example, the dealer personnel can e-mail the CarFax report to the consumer as requested. The CarFax reported is e-mailed as a PDF file and is downloaded at the time of sending the e-mail so that the report is up to date. The dealer personnel work with the consumer and when the consumer is ready to commit to a purchase, the dealer personnel can proceed with the purchase of the vehicle from the auction site VA.

FIG. 16 shows the results page 100 after refinement by the consumer. Specifically, the results are presented in a spreadsheet style format. To reorder the results the consumer can simply click the column headers (e.g., any of Miles, Year, NADA Average Sales Price, Your Wholesale Price or Your Savings) and the system automatically reorganizes the results in a lowest to highest or highest to lowest ordering. In the case of FIG. 16, reordering according to selection of the Your Savings header is shown as compared to FIG. 14. In this regard, the default may be to show the results with the highest savings when the matching results are initially shown. The vehicle results can similarly be reordered according to the other column headers for ease of finding the lowest prices, lowest miles etc.

Although the foregoing description focused on walking through each search category 64A-64H sequentially, it should be understood that the site operates to permit user selection of any one of the categories at any given time. Also, there is no requirement that the user select each and every category for the purpose of carrying out a search.

Referring again to FIG. 1, it is contemplated that the dealer 18 may set up temporary or permanent satellite delivery locations (SDLs) at various places across the country. For example, if the dealer 18 is located in Cincinnati, Ohio and desires to focus on selling used vehicles in Los Angeles, Calif., a satellite office may be established there. When consumers in California search for vehicles, the VARS may utilize the SDL as the delivery location for the purpose of determining the VOP. Moreover, the dealer 18 may establish relationships with other dealers, physical auction sites or other entities across the country for the purpose of finalizing the vehicle delivery to the consumer. In such cases, the VARS may use the closest alternative delivery location ADL to the actual vehicle location for the purpose of determining the VOP. In such cases, it will be necessary to build-in a nominal processing fee for the alternative delivery location ADL operator. Typically this processing fee is on the order of $50 to $100 for handling the paperwork, delivery, etc. When dealing with delivery through an ADL, the customer C3 would first identify vehicle(s) of interest through the web site 16, then work with the dealer 18 to arrange final deal terms, which would include delivery/vehicle pick-up at the ADL site. The dealer 18 would coordinate with the owner of the ADL site to deliver the vehicle and final paperwork for processing of customer pick-up.

Thus, the described system may be implemented with a flexible pricing feature that focuses on the consumer, with different consumers being shown the appropriate pricing based upon the consumers being in different locations. This feature will enhance sales by providing more competitive pricing to the customer when the customer is located closer to the actual vehicle location than to the primary location of the selling dealer.

Other functions that may be included on the web site include the ability for the customer to link a specific vehicle image and/or other data to social network sites such as Facebook, Twitter or Pinterest. This function would enable the customer the ability to immediately and easily share with others the vehicle that the customer is considering purchasing, and obtain valuable feedback on the vehicle before making their final decision.

The VARS may also include other automated functionality, such as automatically evaluating the received vehicle data for vehicles that would be particularly profitable for the dealer, and sending a "Good Buy" alert to a specific e-mail address to alert dealer personnel regarding the vehicles. The dealer can use this information to purchase vehicles for its used vehicle lot, regardless of the fact that no customer has yet agreed to purchase the vehicle.

Figure 18:
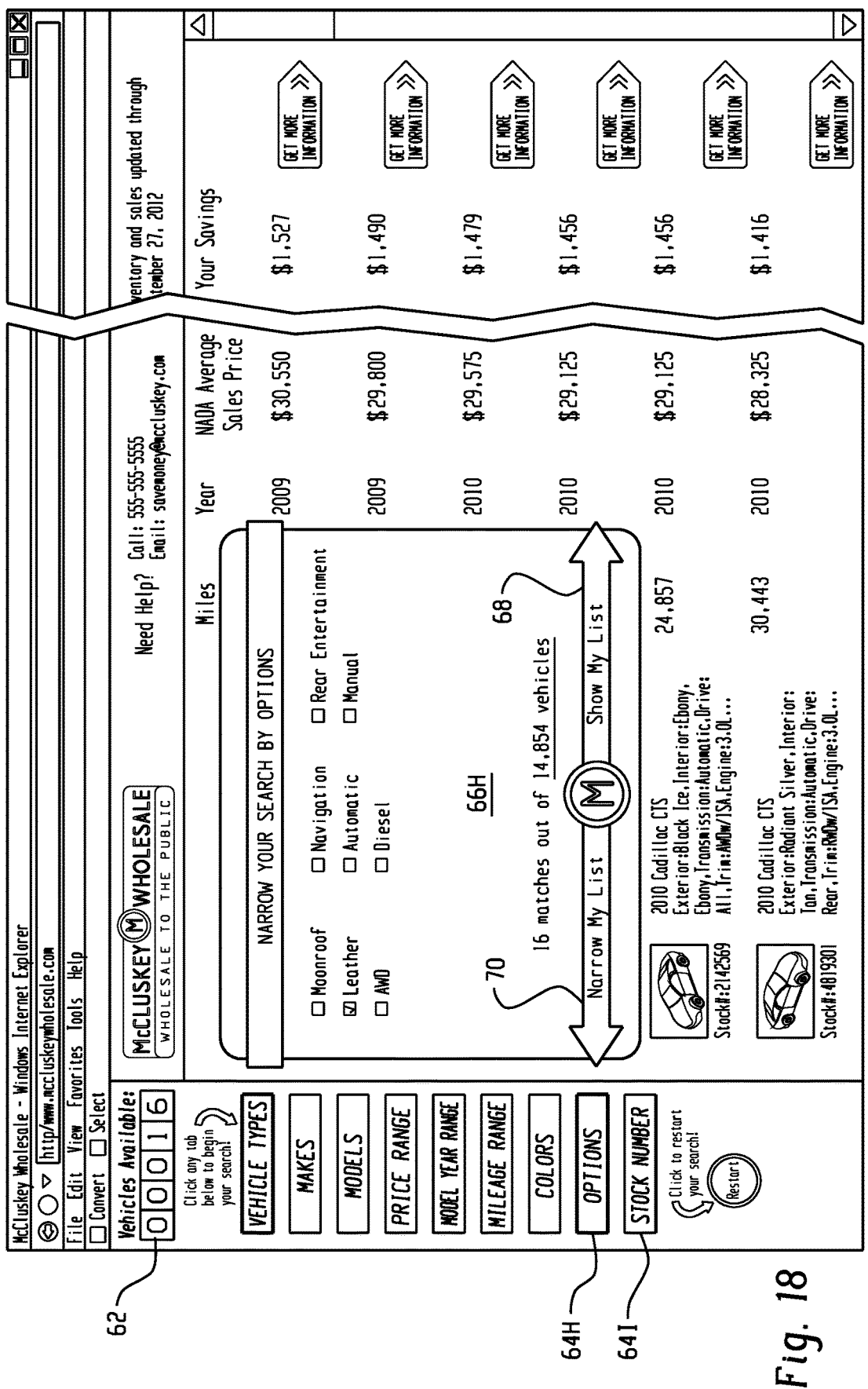
Figure 24:
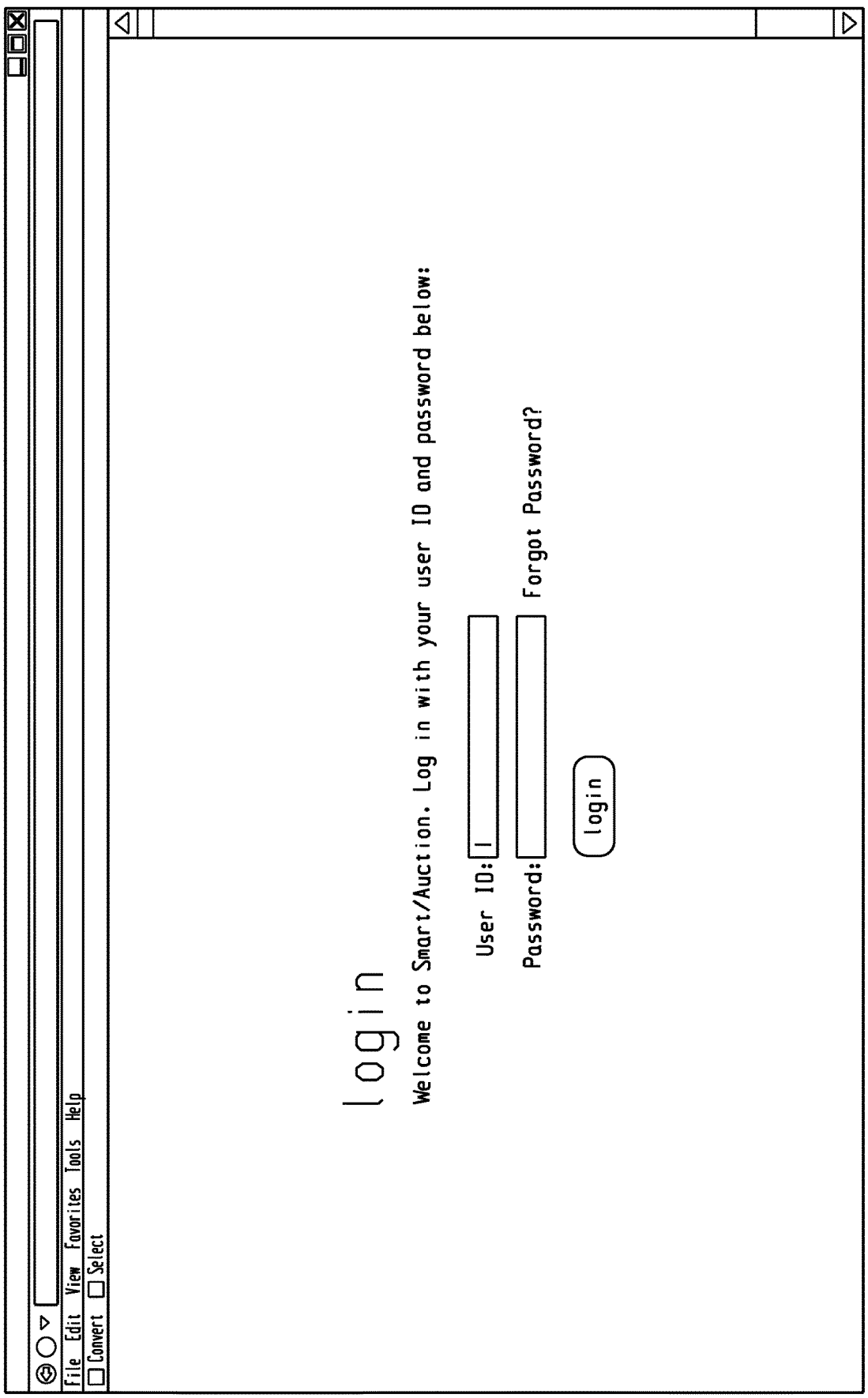
FIGS. 24 and 25 show pages produced by links to the auction web site.

Referring now to FIGS. 17-24, specialized functions available only to the dealer are now described. In this regard, as reflected in FIG. 17 the start page 50 may include a log-in call-up function (e.g., by clicking a particular part of the screen) that opens a login frame 150 for entry of Username and Password data. If the login information is authenticated, the user can access and define vehicle criteria in a manner similar to that described above but with additional data and functionality. In the case of FIG. 18, a logged in user has selected the identical criteria as described above, with an end result of 16 matching vehicles. However, note that the logged in user can select the additional refinement category of Stock Number 641. When the logged in user selects the Show My List graphic 68, the user is presented with results page 160 per FIG. 19. As in the case where the user is not logged in, each vehicle result is presented with vehicle image 102 (e.g., cropped per the action of the VARS), vehicle description 104, mileage, 106, year 108, NADA average retail price 110, the offer price or VOP 112 and the consumer savings or CSV 114. Note however, that each vehicle result also includes a dealer Back of Book value 162 that compares the selling entity price to the average dealer wholesale price.

The dealer results page 160 also includes a function not found on the consumer results page 100, namely the ability to order the results according to dealer profit. In this case such a reordering is achieved by clicking on the odometer graphic 62, with the resulting reordering of the results shown in FIG. 20.

Figure 21:
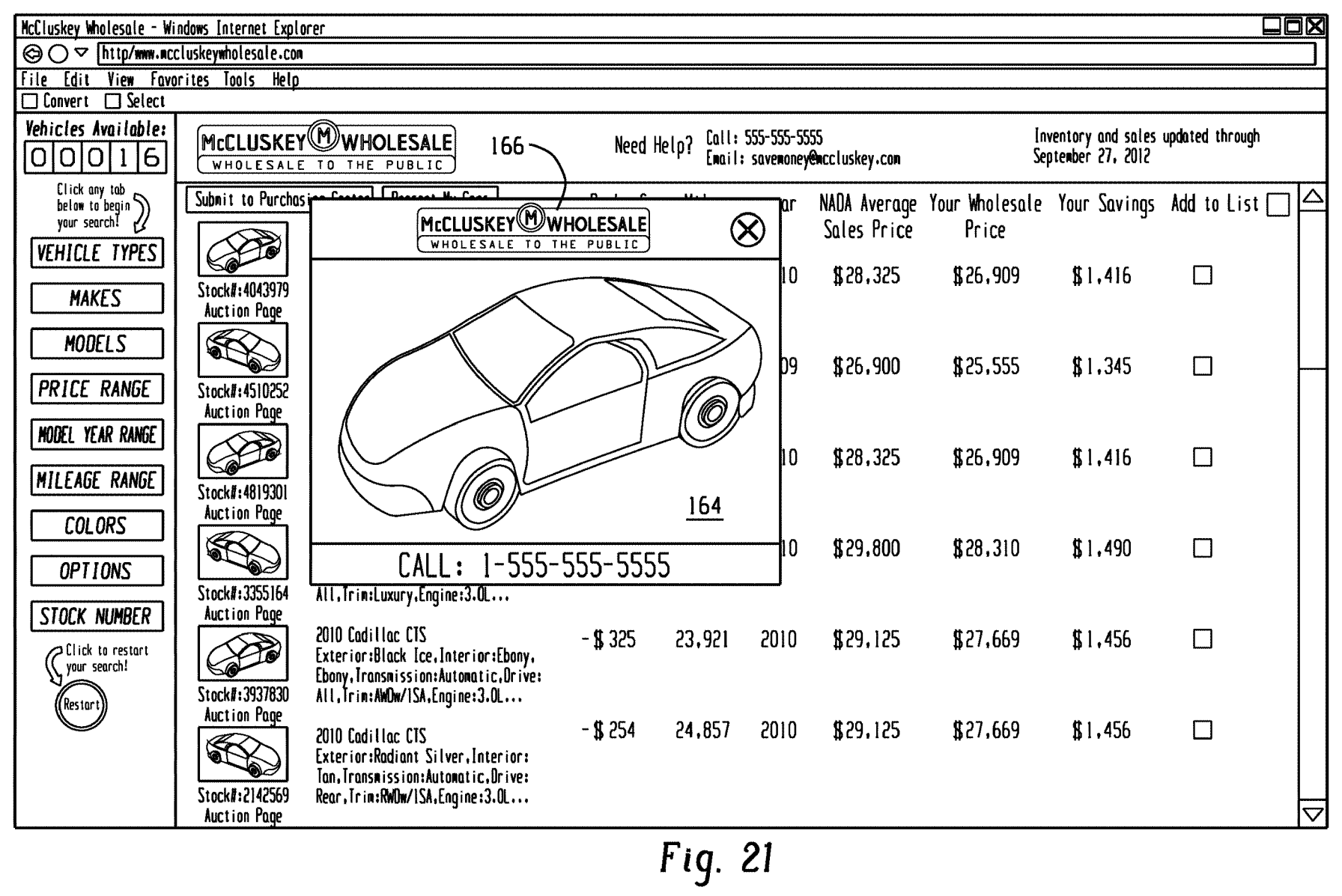
Figure 22A:
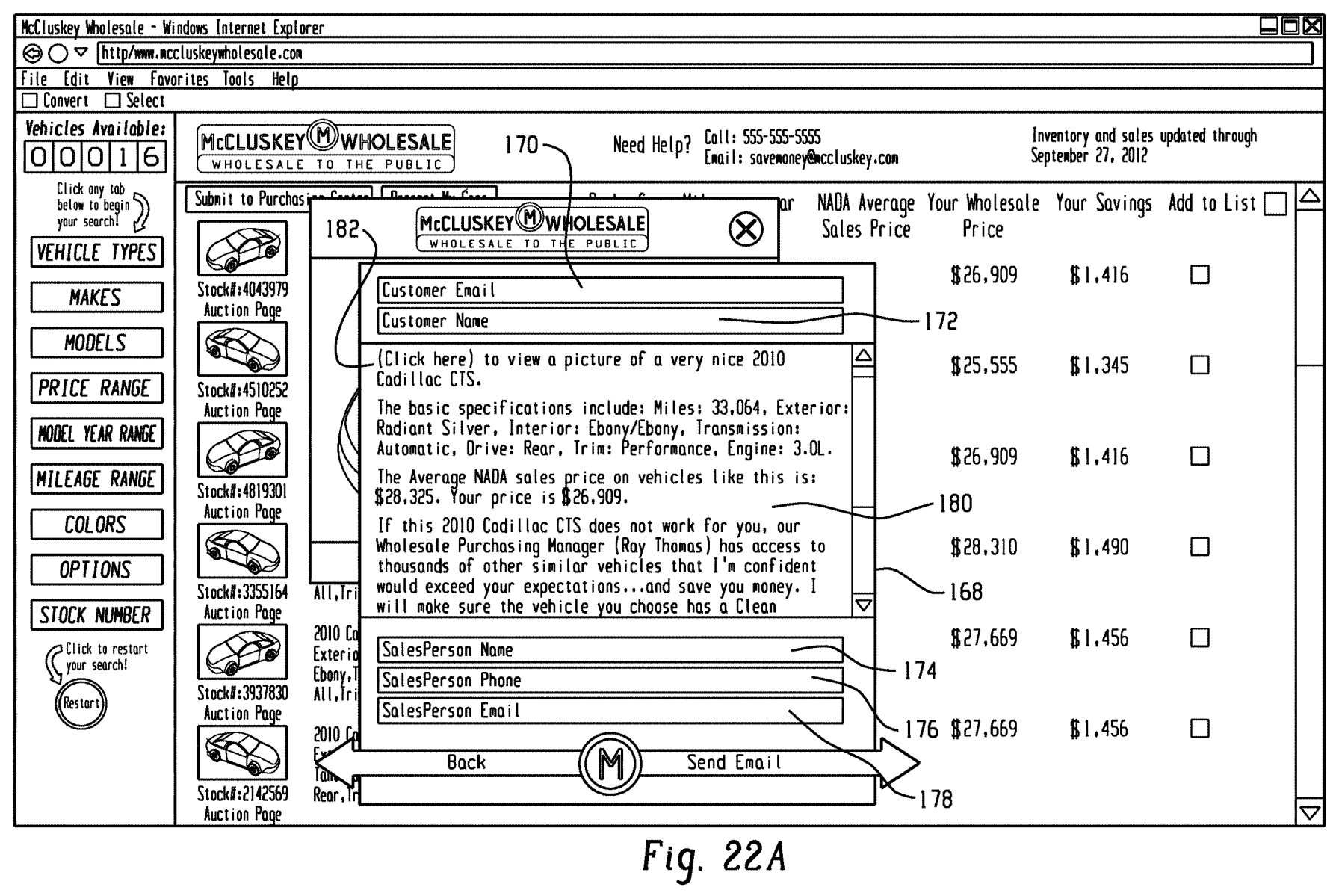
Figure 22B:
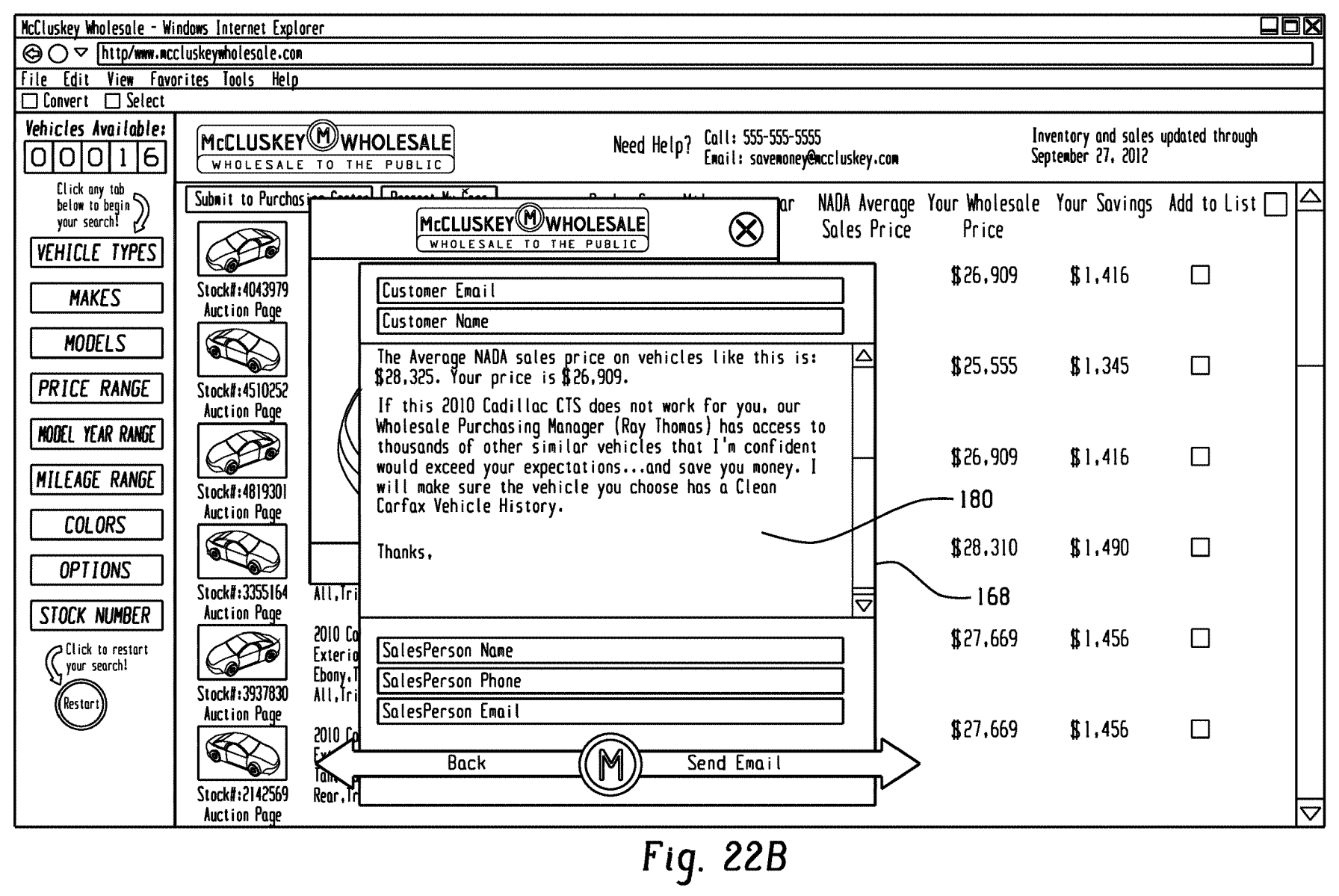

The dealer results page also includes automated messaging functionality that may be triggered by selecting the image icon of a particular vehicle (e.g., 102A), by which the image is shown in a pop-up frame 164 per FIG. 21. By clicking/selecting the dealer logo 166 in the frame 164, an e-mail frame 168 (see FIGS. 22A and 22B) is produced that allows a potential customer's email address and name to be entered in respective fields 170 and 172, along with a salesperson name, phone number and e-mail in respective fields 174, 176 and 178. One or more of fields 174, 176 and 178 may be pre-populated with the proper name, phone number and e-mail based upon data associated with the login information if desired. An e-mail message field 180 is prepopulated with a standard format/customized message to the customer about the particular vehicle associated with the image that was used to pull up the message frame 168. The e-mail message includes a link 182 to the image of the vehicle, along with certain information relating to the vehicle (e.g., make, model, year, mileage, selling price and average NADA price). Salespeople can utilize this feature to easily identify vehicles for customers based upon information the customer has provided, and then forward the information to the customer via their e-mail. The salesperson may choose to modify or add to the message in field 180 as well, if desired. As explained in further detail below, a chat message field or function can also be provided in connection with search results.

Figure 23:
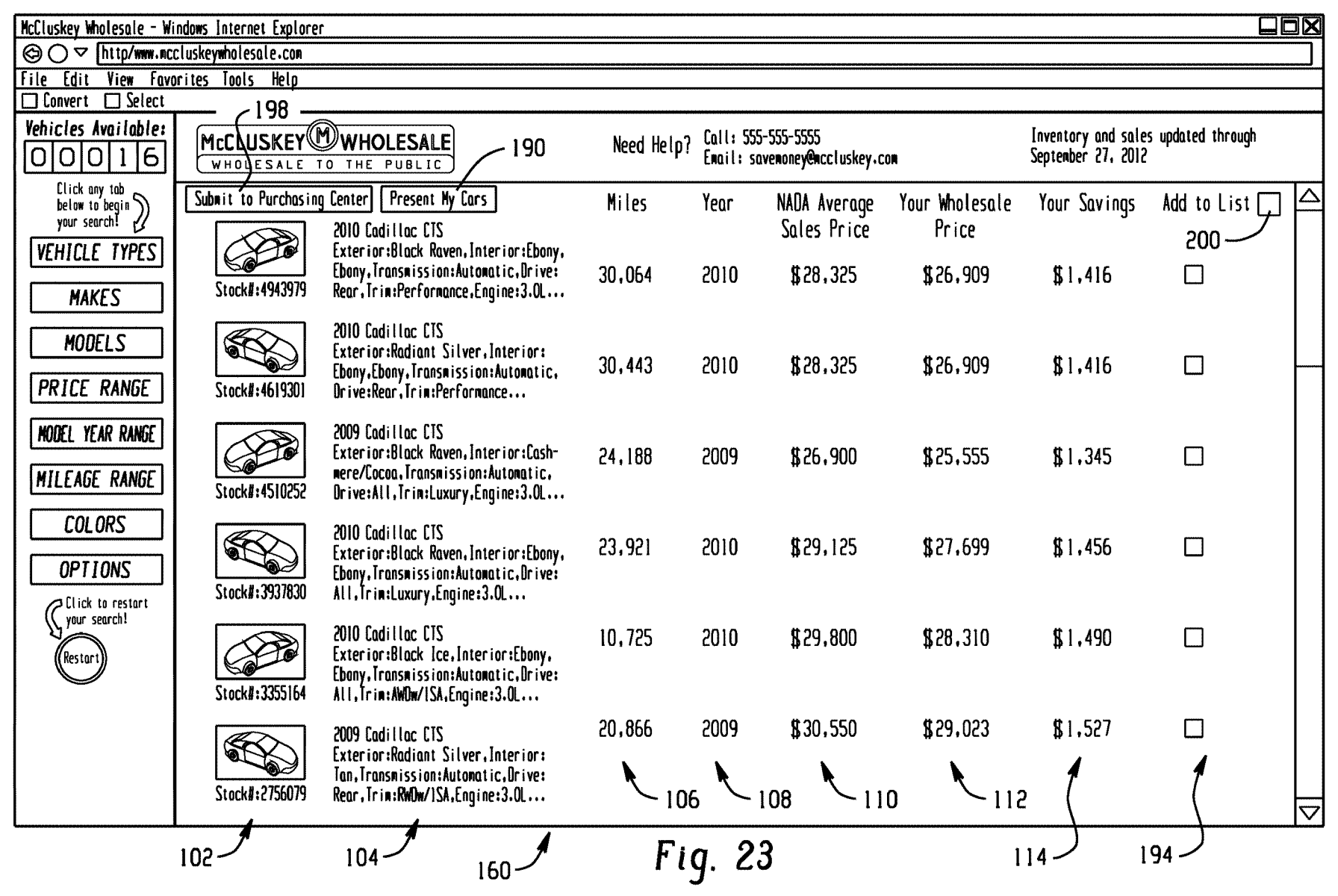

Referring back to FIG. 20, the dealer results page 160 also includes a Present My Cars button 190 that a salesperson can select to eliminate the Back of Book column 162, as shown in FIG. 23. The salesperson may desire to utilize this feature when the salesperson hones in on results for a customer and desires to show the results to the customer (e.g., while the customer is present at the dealership) without providing the Back of Book information, which information may only serve to confuse the customer.

The dealer results page 160 also includes an Add to List column 194 with an associated check box 196 for each vehicle result. The dealer salesperson can check the box or boxes 196 of the vehicles of interest, and when the salesperson subsequently clicks the Submit to Purchasing Center button 198, an e-mail or other message is automatically generated and forwarded to authorized purchasing personnel to begin the process of vetting the vehicle(s) and/or proceeding with purchase of the vehicle(s) from the auction site VA.

Alternatively, a printer icon button 200 is also provided. The salesperson can identify a limited number of vehicles (e.g., up to five) to be used in creating a customer presentation page that is automatically generated when the printer icon button 200 is clicked. The customer presentation page includes an appropriately formatted vehicle summary page with the vehicle photo or photos, details and pricing of each of the selected vehicles, as well as a space next to each listed vehicle for customer selection. The system may enable the salesperson to customize the presentation page by allowing the salesperson to select a particular number (e.g., six) of the photographs available for the vehicle as the salesperson determines those photos best suited to the customer in question. The salesperson utilizes the customer presentation page(s) to discuss the vehicles with the customer, and when the customer makes a final selection, the customer initials in the customer selection space next to the desired vehicle. The salesperson can then use the initialed customer presentation page to have authorized purchasing personnel move forward with purchase of the particular vehicles from the auction site VA. The customer presentation pages may be generated as a PDF that can then be printed off or e-mailed to the customer. One PDF may be created for the customer (without VIN # s) and a different PDF for the dealership personnel/salesperson (with VIN # s), to enable the dealership/salesperson to easily identify the exact vehicle of interest to the customer, assuming the customer responds to the PDF report/pages favorably at some future time.

Finally, the dealer results page also includes an Auction Page link (e.g., 192A of FIG. 20) associated with each vehicle result.

Figure 25:
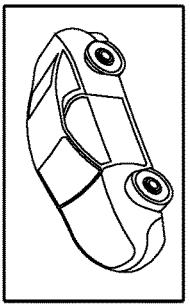

In the dealer version, there is an Auction Page link that hyperlinks to a specific web page associated with the vehicle in question, such as a web page at which the dealer manager can view further information and purchase the vehicle with a simple click of a button (e.g., per FIG. 25 and the BUY NOW button). If the dealer manager is already logged in to the auction web site, the link opens the specific vehicle web page. This operation facilitates the ability of the dealer to easily purchase a vehicle that has been identified for purchase by a customer. Details regarding the vehicle and the current status of the auction for that vehicle are included on the page. If the dealer manager is not already logged into the auction web site, the auction web site opens a log-in page instead (e.g., per FIG. 24).

In another embodiment, the auction web site and the dealer may work out an arrangement such that the hyperlink itself contains or causes a transfer of embedded and/or encrypted login information so that even if the dealer manager is not already logged in, he/she will be taken directly to the specific vehicle web page.

Figure 26:

Referring now to FIGS. 26-30, web pages provided by a variation of the web site 16 (FIG. 1) are shown. In this embodiment, the home or start page 300 of the site is shown in FIG. 26. Notably, the start page in this case is the search page of the site, with the search box 302 for Vehicle Type category 310A already opened and awaiting user selection. The user can select one or more Vehicle Types. Upon selection of one or more Vehicle Types and subsequent selection of the SHOW FILTERED RESULTS button 306 (or the window close button 308), the system will narrow the results to those vehicles that satisfy the Vehicle Types selection. The user can also select any of the other categories 310B-310H and further narrow the search in a similar manner as described above.

Figure 27:
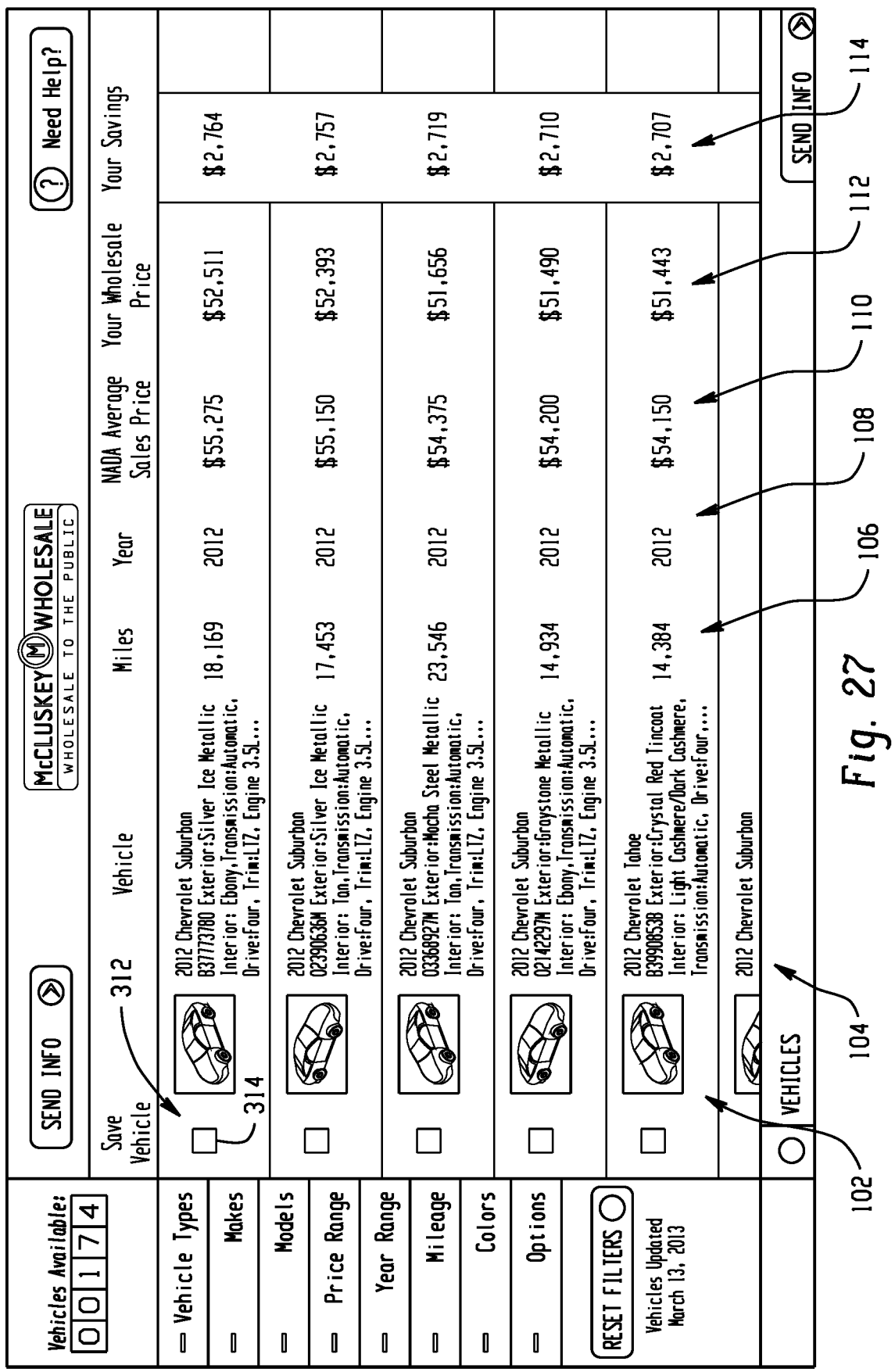
Figure 31:
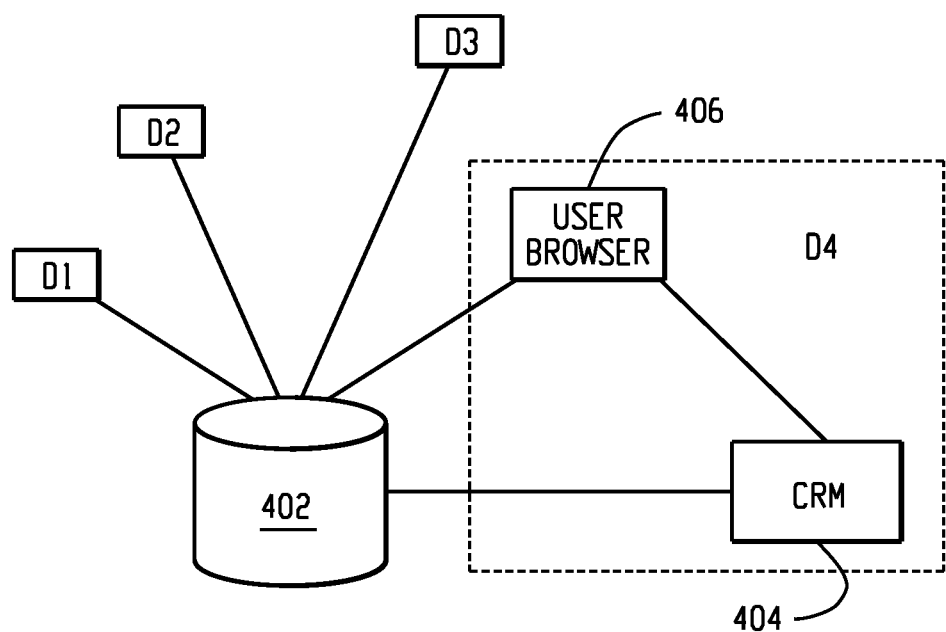

FIG. 27 shows a search results view page 320 in which the results have been narrowed to one-hundred seventy-four vehicles. By comparison to the embodiment described above, each result no longer includes an associated Get More Information graphic, and a horizontal demarcation graphic (e.g., a line) is provided between each vehicle result. Each vehicle result is presented with vehicle image 102 (e.g., cropped per the action of the VARS), vehicle description 104, mileage 106, year 108, NADA average retail price 110, the offer price or VOP 112 and the consumer savings or CSV 114. Notably, a Save Vehicle column 312 is provided, with a corresponding selection box 314 for each vehicle result. Also of note, the particular data set that is being used to set the order of the vehicles (in this case the consumer savings 114) is offset by a columnar shading or other similar effect to make it easier for the user to understand how the vehicles have been organized on the page.

As shown in FIG. 28, vehicle results for which the selection box 314 is selected are loaded into a lower bar region 320 of the main page view. In this case, three vehicles have been selected and loaded into the bar region 320. A total of five vehicles can be selected in this manner, though variations on the number are possible. Moreover, vehicles loaded into the bar region 320 remain loaded even if a new search is initiated. Thus, a user can perform multiple searches and load up vehicles into the bar region from different sets of search results. As shown in FIG. 29, when the pointer is moved atop one of the vehicle boxes loaded in the bar region 320, a pop-up box 324 is automatically generated with additional vehicle information.

Figure 30:
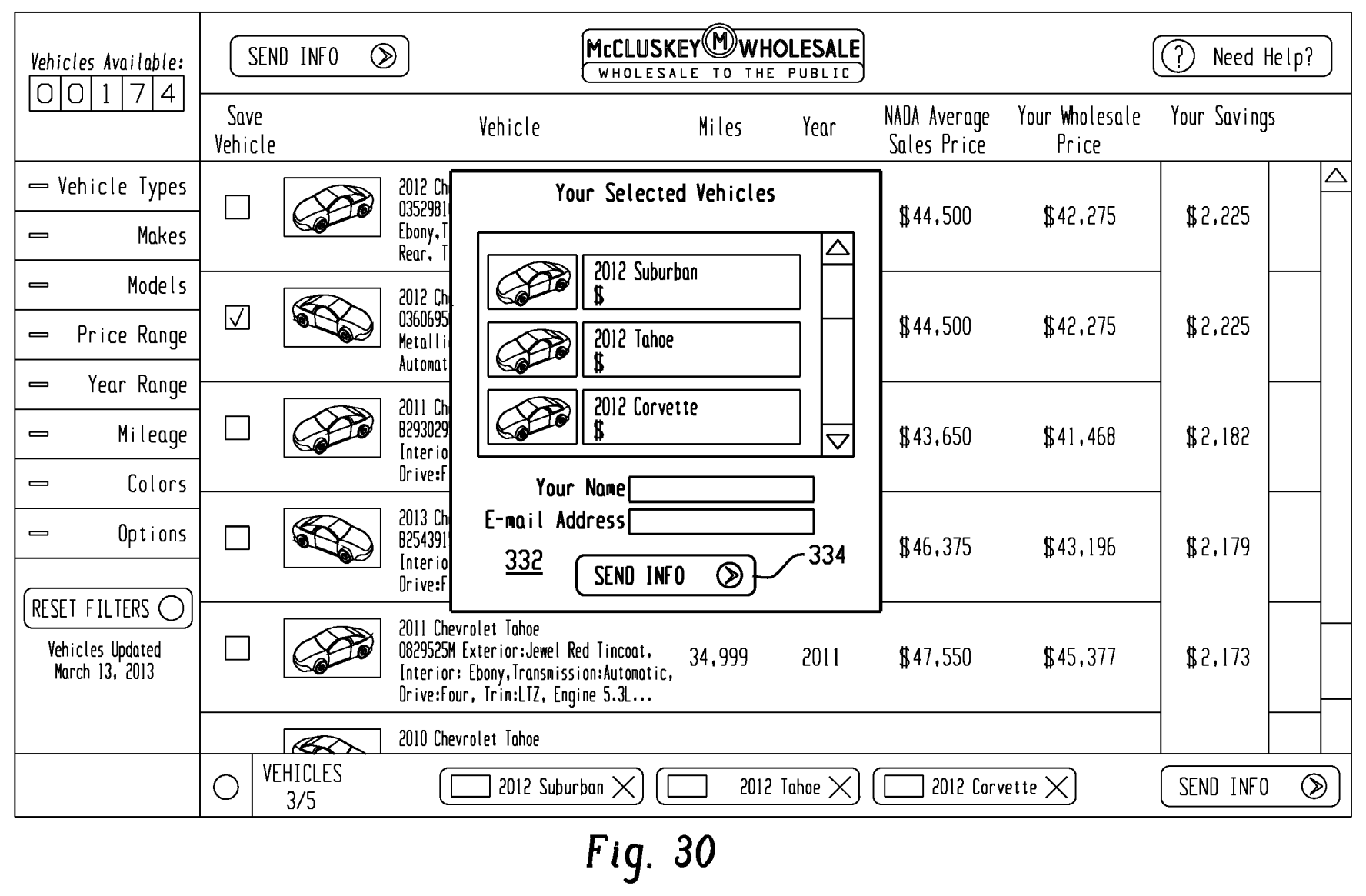

Once one or more vehicle save boxes 314 have been selected, the user can select either of the SEND INFO buttons 330, which will cause the generation of the pop-up frame 332 shown in FIG. 30. This frame shows the loaded vehicles, and provides similar functionality to the pop-up frame 118 described above. The user enters name, e-mail information and phone number, and selects the frame SEND INFO button 334 to request further vehicle details from the wholesaling dealer. Thus, the user can select multiple vehicles as to which further information is desired, and make a single request for information on the multiple vehicles. The pop-up frame may also include an e-mail field enabling the user to select the sales consultant's name (e.g., the sales consultant that has been helping the customer) from a drop-down box so that the selected sales consultant will receive an e-mail notification regarding all vehicles that the customer has selected, so that the sales consultant can continue assisting in the sale (e.g., gathering further vehicle information such as vehicle history etc.).

The system may also be configured to provide deep link capabilities based upon general web searches conducted by potential customers. For example, a person conducting a Google search for "Honda Accord Dayton" may, among other result links, receive a search result link (e.g., a sponsored link or advertised link that the wholesaling dealer has purchase for the territory encompassing Dayton) to the web site 16. Upon selection of the link, the search query information is automatically used by the system 10 to filter the vehicle database records so that only vehicle results having Honda as the Make and Accord as the Model are present on the page to which the potential customer is directed.

Referring now to FIGS. 31-40, in one implementation the vehicle database 402 produced by the VARS is made available to multiple different dealer entities D1-D4 (e.g., a primary dealer may license access to the database 402 to multiples different dealers). All such dealers act as intermediate sellers between the seller actually listing the vehicle for sale on the auction sites and the ultimate customer. Any given dealer, including the primary dealer, may utilize a customer relationship management system 404 that tracks and manages both e-mail communications between the intermediate seller and potential buyers and chat communications between the intermediate seller and potential buyers, as well as potentially other types of communications. In such cases, a link feature may be provided between the searchable database 402 and the customer relationship management system 404. The link feature facilitates an ability to (i) generate CRM connected e-mail and/or chat messages from search results pages produced from the database 402 on a user's web browser 406 and (ii) search the vehicle database from within a CRM connected chat session. The link feature may be enabled through a web browser having a web page open for the searchable database and a web page open for the customer relationship management system (e.g., chat and/or e-mail).

Figure 32:
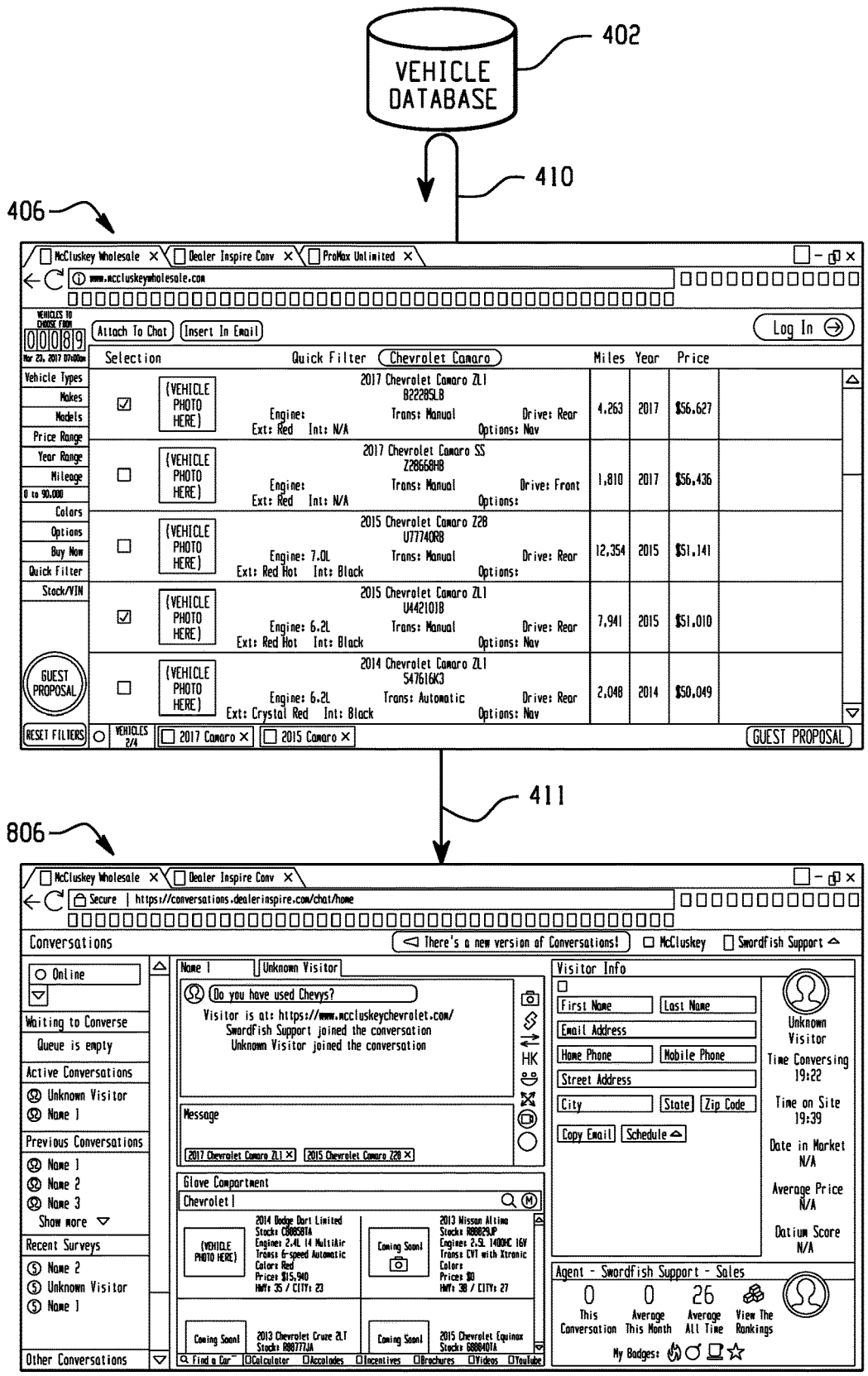
Figure 33:
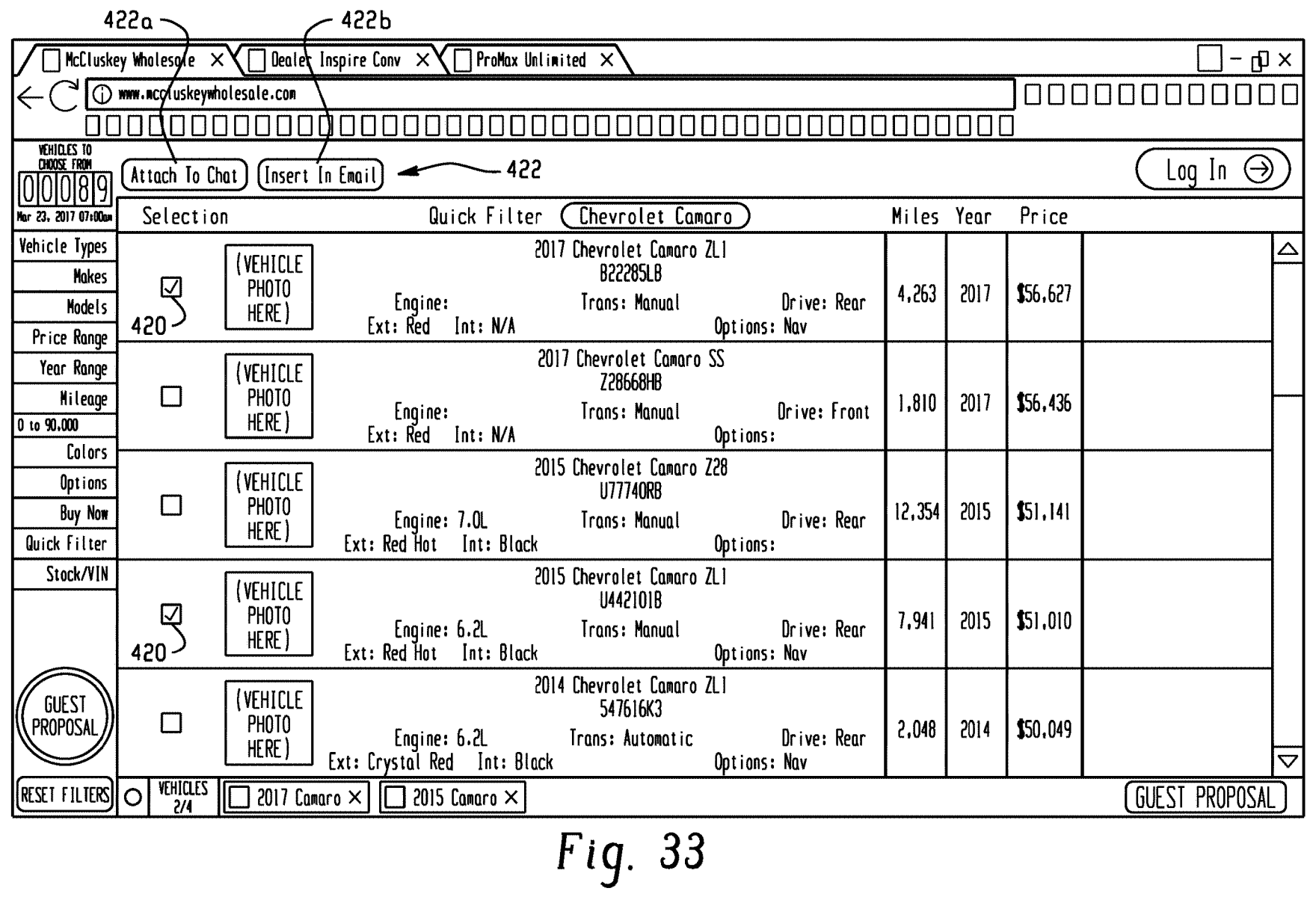
Figure 34:
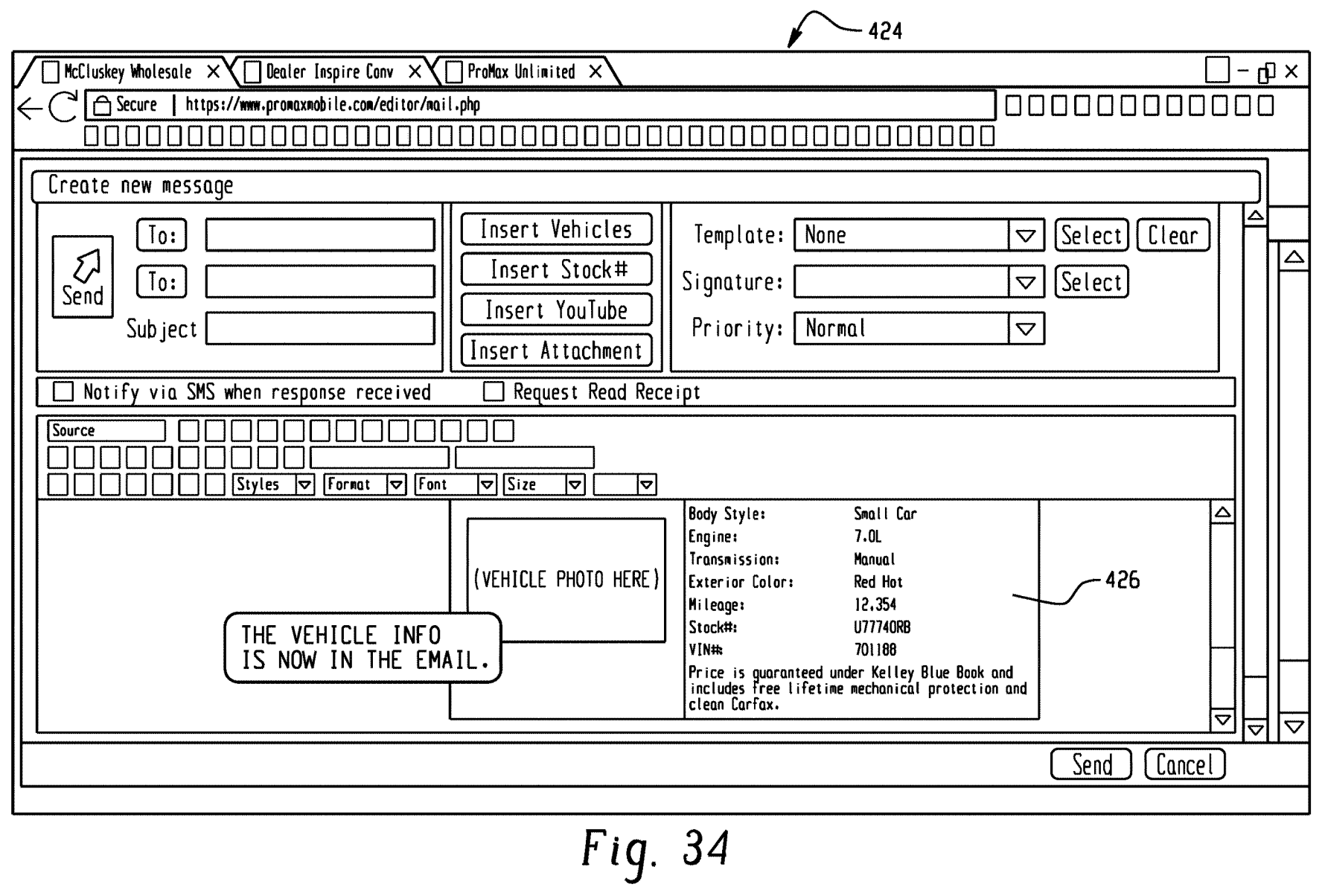
Figure 35:
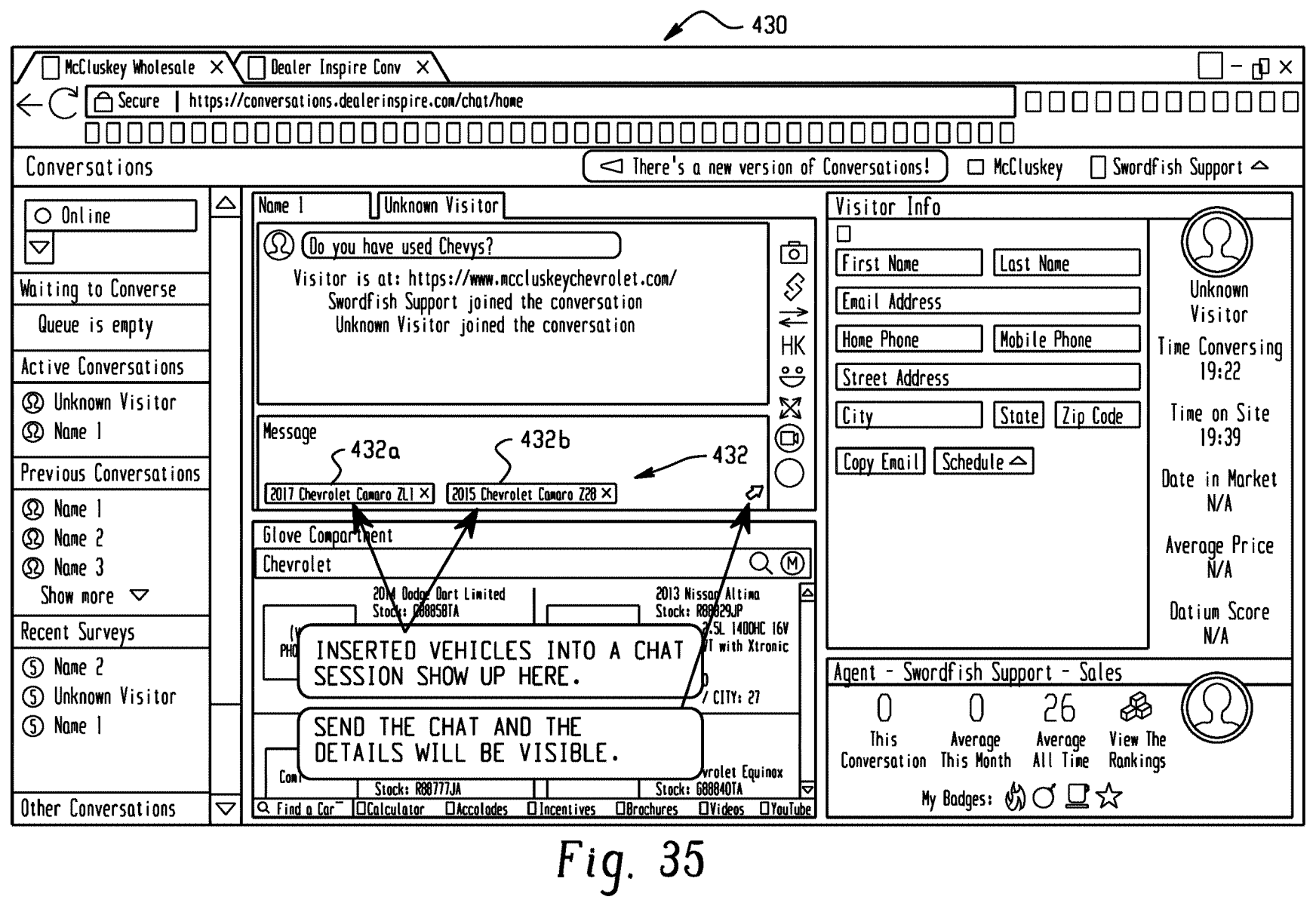
Figure 36:

In terms of generation of CRM connected messages, FIG. 32 shows an exemplary system flow that involves a user querying the database 402 and search results being returned (per 410). On the search results page the user then selects one or more of the results and clicks a message link (e.g., insert to e-mail or insert to chat) so that vehicle information for the selected vehicles is automatically loaded in or attached to a message 408 that is opened by the CRM 404 (per 411). In this regard, as seen in FIG. 33, the search results interface page 408 may include a vehicle selection function 420 (e.g., here a check the box feature for each vehicle result) for each vehicle in the search results and message select functions 422 (e.g., here an attach to chat button 422a and an insert to E-mail button 422b). Upon triggering of the e-mail message select function 422b vehicle information for one or more vehicles selected according to the vehicle selection function 420 is loaded in or attached to a generated e-mail message, and upon triggering of the chat message select function 422a vehicle information for one or more vehicles selected according to the vehicle selection function is loaded in or attached to a generated chat message. FIG. 34 shows an exemplary CRM connected e-mail message 424 opened and having vehicle data 426 (e.g., vehicle image, make, model, year, mileage and/or offer price) inserted into the message, while FIG. 35 shows an exemplary CRM connected chat session interface screen 430 opened and having vehicle data 432 attached to the chat (here data 432a for one vehicle and data 432b for another). As indicated, when the chat is sent, the vehicle data details become visible in the body of the chat itself, per FIG. 36. The messages enable sales personnel to readily communicate vehicle information to potential buyers, while at the same time enabling the CRM to track the customer communications.

Figure 37:
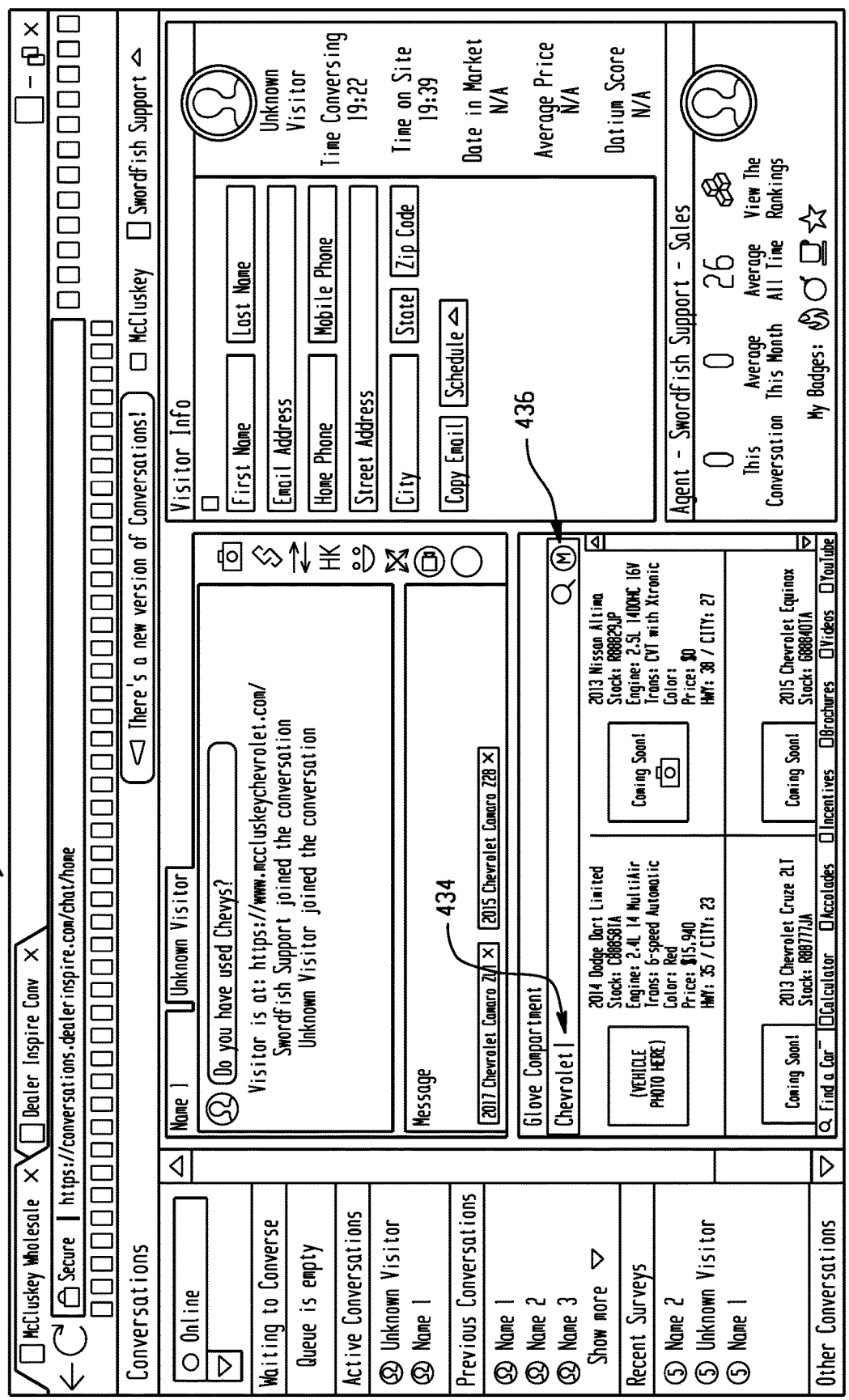
Figure 40:
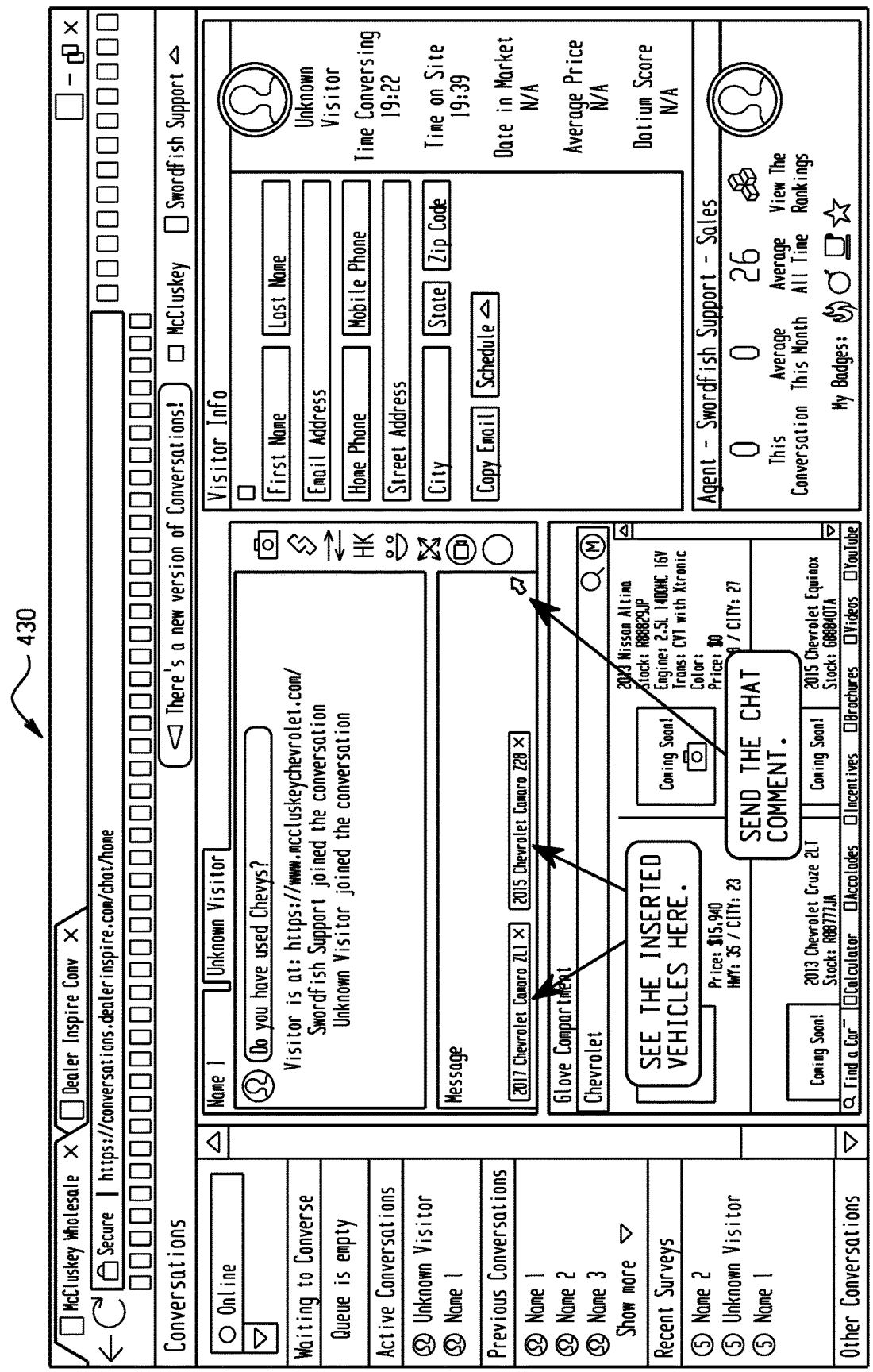

In terms of CRM connected chat session searching, FIG. 37 shows that the chat session interface screen 430 includes a search field 434 that enables the sales personnel to enter vehicle criteria to be searched. Once the criteria is/are entered, the user clicks the search icon 436 which effects a search of the vehicle database and generates a results page 440 associated with the database. The CRM chat session query details are displayed in a field 442 and vehicle results identified consistent with the query are displayed. The user can then further filter down through the results using any of the search refinement categories 64 or by adding more terms to the field 442. When the search results have been narrowed as desired, the sales personnel can then select one or more of the vehicles and then the chat select function 422a, which returns the personnel to the chat session with vehicle information attached (per FIGS. 39-40). Notably, in search results page 440, because the search was generated from a CRM connected chat session, only the chat select function button 422a is displayed (i.e., the e-mail message select function is not displayed). This assures that the sales personnel reconnect to the specific chat session from which the search query was initially started.

It is to be clearly understood that the above description is intended by way of illustration and example only, is not intended to be taken by way of limitation, and that other changes and modifications are possible.

What is claimed is:

1. A system to provide searchable vehicle purchase options, the system comprising:
 a computerized system including one or more processors, memory and program code operable to carry out the following steps:
  (a) receiving, from one or more sources, electronic vehicle data regarding multiple vehicles that are available for purchase from multiple selling parties;
  (b) receiving, from a source, electronic vehicle value data for each of the multiple vehicles;
  (c) assigning, for each of the multiple vehicles, a vehicle offer price at which the vehicle will be offered for subsequent sale, the vehicle offer price incorporating a profit according to an established algorithm;
  (d) establishing a searchable database of vehicle information for the multiple vehicles that includes make, model, model year, mileage, color, vehicle location information, selling party's wholesale selling price and vehicle offer price for each vehicle;
  (e) in response to receiving one or more defined vehicle attributes, searching the database to identify vehicles that satisfy the defined vehicle attributes; and
  (f) presenting for viewing vehicle data for multiple vehicles identified in step (e), including the make, model, model year, mileage, and offer price;
 wherein the computerized system further includes program code operable to carry out one or both of the following steps:
  (g1) exclude from the database of vehicle information established in step (d) and/or the vehicle data presented in step (f) vehicles flagged as problem vehicles according to data received in step (a); and/or (g2) exclude from the database of vehicle information established in step (d) and/or the vehicle data presented in step (f) any vehicle of the multiple vehicles for which the damage repair cost exceeds a specified dollar amount;

wherein step (a) includes receiving a vehicle image for each vehicle and the computerized system further includes program code to automatically crop each vehicle image to a standard relative height and width that is resized to thumbnail and in step (f) the thumbnail is presented for viewing in order to provide faster loading of search results from the database.

2. The system of claim 1 wherein the computerized system includes program code operable to carry out both steps (g1) and (g2).

3. The system of claim 1 wherein the computerized system further includes program code operable to carry out the following steps:

automatically generate a listing of vehicles from the database that meet pre-defined criteria; and automatically e-mail the listing to one or more specified personnel for ease of finding and purchasing vehicles that meet the defined criteria for stocking purposes.

4. The system of claim 3 wherein the defined criteria is one or more of (i) defined profit exceeding a specified amount, (ii) offer price being below a retail vehicle value by at least a specified amount or (iii) certain year, make, model and/or mileage restrictions.

5. The system of claim 4 wherein the listing is automatically generated periodically.

6. The system of claim 1 wherein the computerized system further includes program code operable to carry out the following steps:

calculating, for each of the multiple vehicles a retail difference value that shows the difference between the vehicle offer price and an average retail value for the vehicle;

in step (f) presenting vehicle data including make, model, model year, mileage, offer price, retail value and retail difference value, but the presented vehicle data not including vehicle location or selling party's wholesale selling price or VIN #.

7. The system of claim 1 wherein the computerized system further includes program code operable to carry out the following steps:

providing a limited access Internet website that enables authorized personnel to specify desired vehicle attributes;

in response to receiving the specified vehicle attributes from the authorized personnel, searching the database to identify vehicles that satisfy the specified vehicle attributes;

presenting to the authorized personnel for viewing vehicle data for multiple identified vehicles via a results page, wherein the results page includes a triggerable message function for each identified vehicle by which an automated message is prepared regarding the identified vehicle and presented to the authorized personnel for sending.

8. The system of claim 7 wherein the triggerable message function includes both a triggerable e-mail message function and a triggerable chat message function.

9. The system of claim 8 wherein the computerized system further includes a CRM database system and both triggered e-mail messages and triggered chat messages are tracked via the CRM database system.

10. The system of claim 7 wherein the automated message is an e-mail message into which at least vehicle image, make, model, year, mileage and offer price is loaded.

11. The system of claim 7 wherein the automated message is a chat message into which at least vehicle image, make, model, year, mileage and offer price is loaded.

12. The system of claim 7 wherein the results page includes an auction link for each identified vehicle, the selection of which presents the entity personnel with a web page for a vehicle auction site that is selling the vehicle.

13. A system to provide searchable vehicle purchase options, the system comprising:

a computerized system including one or more processors, memory and program code operable to carry out the following steps:

(a) receiving, from one or more sources, electronic vehicle data regarding multiple vehicles that are available for purchase from multiple selling parties;

(b) receiving, from a source, electronic vehicle value data for each of the multiple vehicles;

(c) assigning, for each of the multiple vehicles, a vehicle offer price at which the vehicle will be offered for subsequent sale, the vehicle offer price incorporating a defined profit;

(d) establishing a searchable database of vehicle information for the multiple vehicles that includes at least make, model, model year, mileage, color, vehicle location information, and vehicle offer price for each vehicle;

(e) in response to receiving one or more defined vehicle attributes, searching the database to identify vehicles that satisfy the defined vehicle attributes; and (f) presenting for viewing vehicle data for multiple vehicles identified in step (e), including the make, model, model year, mileage, and offer price;

wherein the computerized system further includes program code operable to carry out at least one of the following steps:

(g1) exclude from the database of vehicle information established in step (d) and/or the vehicle data presented in step (f) vehicles flagged as problem vehicles according to data received in step (a); or (g2) exclude from the database of vehicle information established in step (d) and/or the vehicle data presented in step (f) any vehicle of the multiple vehicles for which the damage repair cost exceeds a specified dollar amount;

wherein step (a) includes receiving a vehicle image for each vehicle and the computerized system further includes program code to automatically crop each vehicle image to a standard relative height and width that is resized to thumbnail and in step (f) the thumbnail is presented for viewing in order to provide faster loading of search results from the database.

14. The system of claim 13 wherein the computerized system includes program code operable to carry out both steps (g1) and (g2).

15. A system to provide searchable vehicle purchase options, the system comprising:

a computerized system including one or more processors, memory and program code operable to carry out the following steps:

(a) receiving, from one or more sources, electronic vehicle data regarding multiple vehicles that are available for purchase from multiple selling parties;

(b) receiving, from a source, electronic vehicle value data for each of the multiple vehicles;

(c) assigning, for each of the multiple vehicles, a vehicle offer price at which the vehicle will be offered for subsequent sale, the vehicle offer price incorporating a profit according to an established algorithm;

(d) establishing a searchable database of vehicle information for the multiple vehicles that includes make, model, model year, mileage, color, vehicle location information, selling party's wholesale selling price and vehicle offer price for each vehicle;

(e) in response to receiving one or more defined vehicle attributes, searching the database to identify vehicles that satisfy the defined vehicle attributes; and (f) presenting for viewing vehicle data for multiple vehicles identified in step (e), including the make, model, model year, mileage, and offer price;

wherein step (a) includes receiving a vehicle image for each vehicle and the computerized system further includes program code to automatically crop each vehicle image to a standard relative height and width that is resized to thumbnail and in step (f) the thumbnail is presented for viewing in order to provide faster loading of search results from the database.

* * * * *